US012767346B1

(12) United States Patent
Cooling et al.

(10) Patent No.: US 12,767,346 B1
(45) Date of Patent: Oct. 20, 2026

(54) ENGINE SPOOL-SELECTABLE TRANSMISSIONS FOR GENERATORS/MOTORS/STARTERS AND RELATED COMPONENTS

(71) Applicant: Hamilton Sundstrand Corporation, Charlotte, NC (US)

(72) Inventors: Aaron J. Cooling, Janesville, WI (US); Sean P. Friel, Rockford, IL (US); Jake R. Barton, Marengo, IL (US); Glenn C. Lemmers, Jr., Loves Park, IL (US); Aaron M. Finke, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/270,239

(22) Filed: Jul. 15, 2025

Related U.S. Application Data

(60) Provisional application No. 63/806,525, filed on May 15, 2025.

(51) Int. Cl.
*B64D 27/33* (2024.01)
*B64D 35/021* (2024.01)
*F16D 23/02* (2006.01)

(52) U.S. Cl.
CPC .......... *B64D 35/021* (2024.01); *F16D 23/02* (2013.01); *B64D 27/33* (2024.01)

(58) Field of Classification Search
CPC .... B64D 27/33; B64D 35/022; B64D 35/023; B64D 35/024; B64D 35/025; B64D 31/18; F02C 7/36; F02C 7/32; F16D 23/14–23/148; F16D 21/02
See application file for complete search history.

(56) References Cited

U.S. PATENT DOCUMENTS

| | | | | |
|---|---|---|---|---|
| 3,626,692 | A * | 12/1971 | Kumm | F02C 7/36 475/32 |
| 3,943,374 | A * | 3/1976 | Clements | F01D 5/026 415/910 |
| 6,148,983 | A | 11/2000 | Borjesson | |
| 8,015,828 | B2 * | 9/2011 | Moniz | F02C 7/275 60/788 |
| 8,534,074 | B2 * | 9/2013 | Copeland | F02C 7/36 60/39.163 |
| 10,634,197 | B2 * | 4/2020 | Rice | F16D 35/005 |
| 10,738,709 | B2 * | 8/2020 | Forest | F02C 7/32 |

(Continued)

FOREIGN PATENT DOCUMENTS

| | | | | |
|---|---|---|---|---|
| EP | 3530928 | B1 * | 9/2021 | B64D 35/024 |
| FR | 3087423 | A1 * | 4/2020 | F16D 28/00 |

*Primary Examiner* — Sherry L Estremsky

(57) ABSTRACT

An apparatus includes a selectable transmission configured to selectively couple a specified one of multiple spools of an aircraft engine to an electric machine. The selectable transmission include a mechanical output coupled to or forming a part of the electric machine, at least one clutch configured to drive or be driven by the mechanical output, and at least one selective actuator configured to move the at least one clutch in order to selectively control which spool drives or is driven by the mechanical output. The electric machine is configured to speed match the at least one clutch to one of the spools to facilitate engagement, and/or a synchronizer is configured to speed match the electric machine to one of the spools or to speed match two or more of the spools.

20 Claims, 32 Drawing Sheets

(56) References Cited

U.S. PATENT DOCUMENTS

| | | | | |
|---|---|---|---|---|
| 10,767,568 | B2 | 9/2020 | Leque et al. | |
| 11,220,960 | B2 | 1/2022 | Leque et al. | |
| 12,084,195 | B2 | 9/2024 | Finke et al. | |
| 2007/0265761 | A1 | 11/2007 | Dooley et al. | |
| 2009/0007569 | A1 | 1/2009 | Lemmers, Jr. et al. | |
| 2021/0388733 | A1 | 12/2021 | Valois et al. | |
| 2022/0348347 | A1* | 11/2022 | Finke | F16D 41/00 |
| 2022/0352836 | A1 | 11/2022 | Hayes et al. | |
| 2024/0025555 | A1 | 1/2024 | Zatorski et al. | |
| 2025/0158492 | A1 | 5/2025 | Hayes et al. | |

* cited by examiner

ENGINE SPOOL-SELECTABLE TRANSMISSIONS FOR GENERATORS/MOTORS/STARTERS AND RELATED COMPONENTS

CROSS-REFERENCE TO RELATED APPLICATION AND PRIORITY CLAIM

This application claims priority under 35 U.S.C. § 119(e) to U.S. Provisional Patent Application No. 63/806,525 filed on May 15, 2025, which is hereby incorporated by reference in its entirety.

TECHNICAL FIELD

This disclosure is generally directed to transmission systems. More specifically, this disclosure is directed to engine spool-selectable transmissions for generators/motors/starters and related components.

BACKGROUND

Various types of aircraft can use generators to produce electric power, where the generators extract mechanical power from aircraft engines. Often times, this power is extracted from a high-pressure (HP) spool because (i) the HP spool typically has a narrow speed range and (ii) generators are significantly lighter and simpler when designed for a narrow speed range. While aircraft engines can use less fuel if power is extracted from a low-pressure (LP) spool, a generator would typically be very heavy if directly driven from the LP spool.

SUMMARY

This disclosure relates to engine spool-selectable transmissions for generators/motors/starters and related components.

In some examples, an apparatus may include a selectable transmission configured to selectively couple a specified one of multiple spools of an aircraft engine to an electric machine. The selectable transmission may include a mechanical output coupled to or forming a part of the electric machine, at least one clutch configured to drive or be driven by the mechanical output, and at least one selective actuator configured to move the at least one clutch in order to selectively control which spool drives or is driven by the mechanical output. The electric machine may be configured to speed match the at least one clutch to one of the spools to facilitate engagement, and/or a synchronizer may be configured to speed match the electric machine to one of the spools or to speed match two or more of the spools.

In other examples, a system includes an aircraft engine having multiple spools, an electric machine configured to selectively drive or be driven by one of the spools, and a selectable transmission configured to selectively couple a specified one of the spools to the electric machine. The selectable transmission includes a mechanical output coupled to or forming a part of the electric machine, at least one clutch configured to drive or be driven by the mechanical output, and at least one selective actuator configured to move the at least one clutch in order to selectively control which spool drives or is driven by the mechanical output. The electric machine may be configured to speed match the at least one clutch to one of the spools to facilitate engagement, and/or a synchronizer may be configured to speed match the electric machine to one of the spools or to speed match two or more of the spools.

In still other examples, a method includes using a selectable transmission to selectively couple one of multiple spools of an aircraft engine to an electric machine. The selectable transmission includes a mechanical output coupled to or forming a part of the electric machine, at least one clutch configured to drive or be driven by the mechanical output, and at least one selective actuator configured to move the at least one clutch in order to selectively control which spool drives or is driven by the mechanical output. The method also includes driving the electric machine using one of the spools or driving one of the spools using the electric machine via the selectable transmission. The electric machine may be configured to speed match the at least one clutch to one of the spools to facilitate engagement, and/or a synchronizer may be configured to speed match the electric machine to one of the spools or to speed match two or more of the spools.

Any single one or any combination of the following features may be used with any of the examples above.

The at least one clutch may represent a single clutch, the at least one selective actuator may represent a single selective actuator, and the single selective actuator may be configured to move the single clutch between multiple positions to selectively control which spool drives or is driven by the mechanical output. The multiple positions may include a first position in which the single clutch is coupled to at least one gear associated with a first spool of the aircraft engine, a second position in which the single clutch is coupled to at least one gear associated with a second spool of the aircraft engine, and a third position in which the single clutch is not coupled to the at least one gear associated with the first spool or to the at least one gear associated with the second spool.

The at least one clutch may represent a first clutch associated with a first spool of the aircraft engine and a second clutch associated with a second spool of the aircraft engine, the at least one selective actuator may be configured to move the first clutch between multiple positions to selectively control whether the mechanical output drives or is driven by the first spool, and the at least one selective actuator may be configured to move the second clutch between multiple positions to selectively control whether the mechanical output drives or is driven by the second spool. The multiple positions of the first clutch may include a first position in which the first clutch is coupled to at least one gear associated with the first spool and a second position in which the first clutch is not coupled to the at least one gear associated with the first spool. The multiple positions of the second clutch may include a first position in which the second clutch is coupled to at least one gear associated with the second spool and a second position in which the second clutch is not coupled to the at least one gear associated with the second spool.

The selectable transmission may be configured to halt mechanical power injection or extraction to or from the spools to facilitate the speed matching.

The at least one selective actuator may include at least one selector fork.

The selectable transmission may be integrated in the electric machine. For example, the mechanical output may be coupled to a rotor of the electric machine.

One or more position controllers may be used, and each position controller may be configured to control one or more positions of one or more corresponding selective actuators and/or one or more positions of one or more corresponding clutches. Each position controller may include a control piston. Each position controller may be movable and configured to move the one or more corresponding selective actuators and/or the one or more corresponding clutches between multiple positions. The multiple positions may include a first position in which a first spool drives or is driven by the mechanical output, a second position in which a second spool drives or is driven by the mechanical output, and a third position in which no spool drives or is driven by the mechanical output. A dual-acting hydraulic system may be coupled to each control piston, and the dual-acting hydraulic system may include a supply pump configured to provide fluid to the control piston and a tank configured to receive the fluid from the control piston. Each position controller may include multiple springs configured to bias the position controller such that the corresponding selective actuator and/or the corresponding clutch is in the third position. Each position controller may include multiple springs configured to bias the position controller such that the corresponding selective actuator and/or the corresponding clutch is in one of the first position or the second position. Each position controller may be associated with an actuator configured to move the position controller. The actuator associated with each position controller may include a linear actuator. Each linear actuator may include a reset ring configured to reset the linear actuator and/or a rod configured to prevent movement of the linear actuator. Each linear actuator may include a plunger or a rack and pinion. The actuator associated with each position controller may include a servo valve-actuated actuator. Each position controller may be associated with one or more springs configured to bias the position controller in a first direction, and the servo valve-actuated actuator associated with the position controller may be configured to apply pressure to the position controller in order to move the position controller in a second direction opposite the first direction. Each position controller may be associated with a failsafe configured to move the position controller such that the corresponding selective actuator is in a neutral position. Each failsafe may include a linear actuator. Each failsafe may include a reset ring configured to reset the linear actuator and/or a rod configured to prevent movement of the linear actuator.

An interface between each selective actuator and a corresponding clutch may include a rolling element interface. Each rolling element interface may include one of: a ball bearing interface, a roller bearing interface, a ball thrust bearing interface, a roller thrust bearing interface, or a tapered roller bearing interface. Each rolling element interface may include rolling element bearings between at least one outer race and at least one inner race. Each clutch may include an anti-rotation feature configured to prevent rotation of the corresponding selective actuator with respect to the clutch and/or an axial retainer configured to keep the corresponding selective actuator positioned over the outer race of the clutch. Each selective actuator may include springs positioned between the selective actuator and the outer race of the corresponding clutch, and the springs may be configured to provide a specified preload on the outer race of the corresponding clutch. In each clutch, the outer race of the clutch may include a flange, and the flange may be attached to the corresponding selective actuator. The at least one outer race may include multiple outer races, the at least one inner race may include multiple inner races, and the rolling element bearings may be positioned between the multiple outer races and the multiple inner races.

The at least one selective actuator may represent a single selective actuator configured to move both of the first and second clutches.

The at least one selective actuator may represent a first selective actuator configured to move the first clutch and a second selective actuator configured to move the second clutch.

The electric machine may be used as a generator, a motor, an engine starter, or a combination thereof.

The selectable transmission may include a mechanically-driven pump configured to be driven by one of the spools or the mechanical output.

Each clutch may include dog tooth interfaces configured to mate with dog tooth interfaces of connecting members.

Each clutch may include a stop configured to limit movement of the corresponding selective actuator.

The multiple spools may include two or more of a high-pressure (HP) spool, an intermediate-pressure (IP) spool, and a low-pressure (LP) spool.

In yet other examples, an apparatus includes a clutch and a selective actuator configured to move the clutch, where an interface between the selective actuator and the clutch is a rolling element interface. The rolling element interface may include one of: a ball bearing interface, a roller bearing interface, a ball thrust bearing interface, a roller thrust bearing interface, or a tapered roller bearing interface. The rolling element interface may include rolling element bearings between at least one outer race and at least one inner race. The apparatus may include an anti-rotation feature configured to prevent rotation of the selective actuator with respect to the clutch. The apparatus may include an axial retainer configured to keep the selective actuator positioned over the outer race of the clutch. The selective actuator may include springs positioned between the selective actuator and the outer race of the clutch. The springs may be configured to provide a specified preload on the outer race of the clutch. The outer race of the clutch may include a flange, and the flange may be attached to the selective actuator. The at least one outer race may include multiple outer races, the at least one inner race may include multiple inner races, and the rolling element bearings may be positioned between the multiple outer races and the multiple inner races. The clutch may include dog tooth interfaces configured to mate with dog tooth interfaces of connecting members. The apparatus may include a stop configured to limit movement of the selective actuator.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 19C, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various types of aircraft can use generators to produce electric power, where the generators extract mechanical power from aircraft engines. Often times, this power is extracted from a high-pressure (HP) spool because (i) the HP spool typically has a narrow speed range and (ii) generators are significantly lighter and simpler when designed for a narrow speed range. While aircraft engines can use less fuel if power is extracted from a low-pressure (LP) spool, a generator would typically be very heavy if directly driven from the LP spool.

This disclosure provides various engine spool-selectable transmissions for generators/motors/starters and various related components, such as integrated selection generators, control piston actuation techniques, and rolling element bearings for selective actuator interfaces. These transmissions, integrated selection generators, control piston actuation techniques, and rolling element bearings are described in detail below. The engine spool-selectable transmissions and related components can provide various benefits, such as improved driving of a generator or other electric machine using either the LP spool or the HP spool of an engine. For example, the electric machine does not need to be sized for the full speed range of the LP spool, which can reduce the weight of the electric machine. Also, the electric machine can be selectively connected to the LP spool or the HP spool to assist in engine starting. In addition, the electric machine can extract power from the LP spool (rather than the HP spool) at low speeds, which can reduce fuel consumption of the engine.

Figure 1:
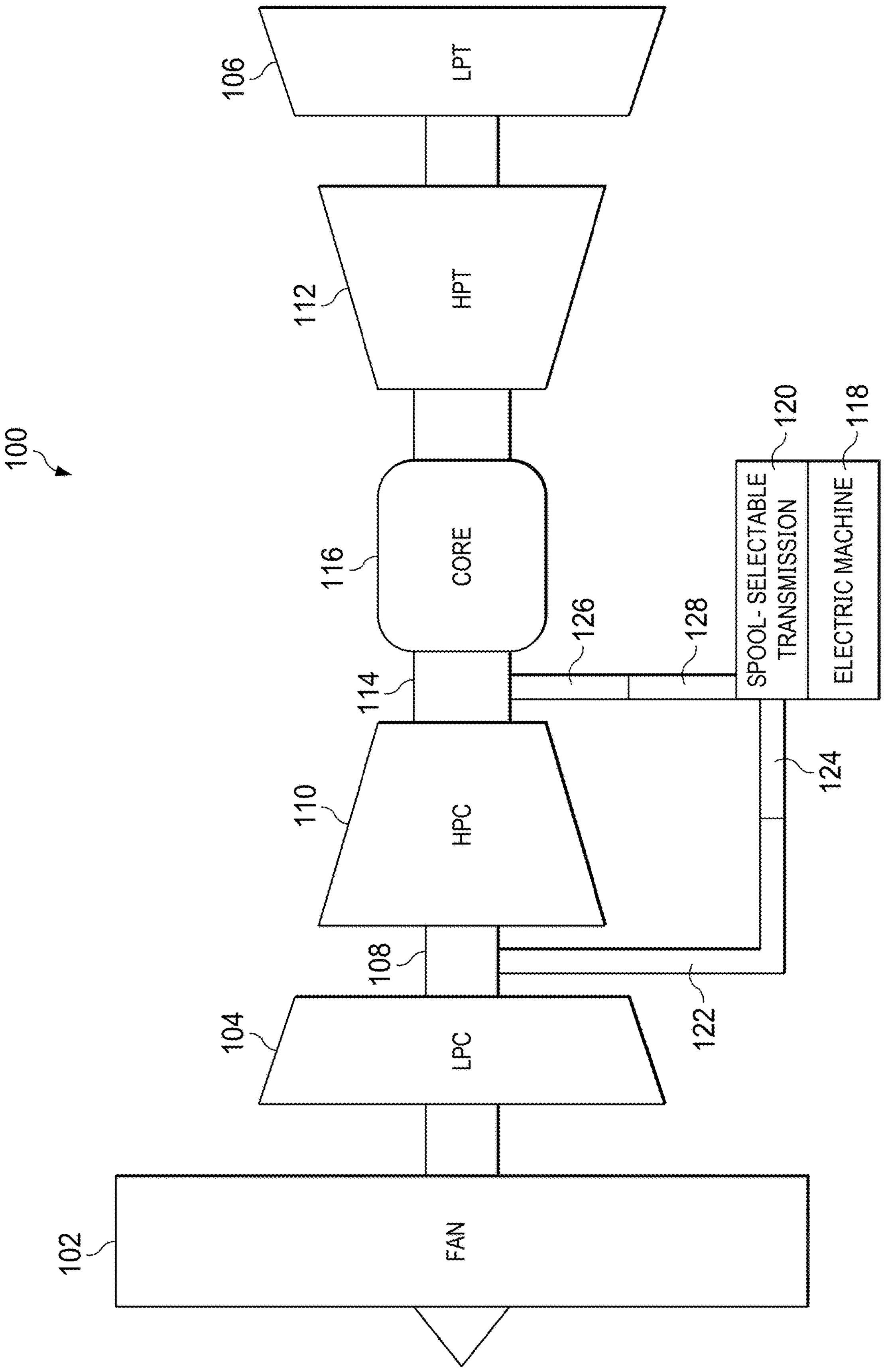
FIG. 1 illustrates an example gas turbine engine having an engine spool-selectable transmission and related components in accordance with this disclosure.

FIG. 1 illustrates an example gas turbine engine 100 having an engine spool-selectable transmission and related components in accordance with this disclosure. As shown in FIG. 1, the gas turbine engine 100 includes a fan section 102, which generally operates to drive air through one or more paths of the gas turbine engine 100. The gas turbine engine 100 also includes a low-pressure (LP) spool, where the LP spool includes a low-pressure compressor (LPC) 104, a low-pressure turbine (LPT) 106, and an inner shaft 108. The inner shaft 108 can be connected to the fan section 102, either directly or indirectly (such as via a speed change mechanism like a gear set). The gas turbine engine 100 further includes a high-pressure (HP) spool, where the HP spool includes a high-pressure compressor (HPC) 110, a high-pressure turbine (HPT) 112, and an outer shaft 114 and where the inner shaft 108 can pass through the outer shaft 114. An engine core 116 is positioned between the high-pressure compressor 110 and the high-pressure turbine 112 and can include various engine components, such as a combustor.

During operation, core airflow can be compressed by the low-pressure compressor 104 and by the high-pressure compressor 110, mixed and burned with fuel in the engine core 116, and expanded over the high-pressure turbine 112 and low-pressure turbine 106. The LP spool of the gas turbine engine 100 typically has a larger speed range compared to the HP spool of the gas turbine engine 100.

Note that this represents a simplified discussion of the gas turbine engine 100 and its design and operation. Additional details regarding the design and operation of gas turbine engines are known in the art. Moreover, this embodiment of the gas turbine engine 100 represents a two-spool turbofan engine. However, the gas turbine engine 100 may be implemented in any other suitable manner that includes at least two spools.

An electric machine 118 can be used in conjunction with the gas turbine engine 100. The electric machine 118 is configured to drive or to be driven by one of the spools of the gas turbine engine 100. As an example, the electric machine 118 may represent a generator that can be used to produce electrical power when driven by one of the spools of the gas turbine engine 100. As another example, the electric machine 118 may represent a motor or engine starter that can be used to produce electrical power for one of the spools of the gas turbine engine 100. Note that the electric machine 118 may also represent a combination of two or more of a generator, motor, or engine starter. In some embodiments, the electric machine 118 may be used to generate electrical power for one or more accessories or other subsystems of an aircraft.

In order to drive the electric machine 118 using the spools of the gas turbine engine 100 (or vice versa), a spool-selectable transmission 120 can be used to mechanically couple the electric machine 118 to either the LP spool or the HP spool of the gas turbine engine 100. For example, the spool-selectable transmission 120 may selectively couple the electric machine 118 to the LP spool or the HP spool of the gas turbine engine 100 depending on the operating mode of the electric machine 118 or the gas turbine engine 100. Thus, for instance, the spool-selectable transmission 120 may couple the electric machine 118 to the LP spool or to the HP spool during startup of the gas turbine engine 100. At lower speeds, the spool-selectable transmission 120 may couple the electric machine 118 to the LP spool when the LP spool is operating within a specified speed range (which can be smaller than the total speed range of the LP spool), such as when the LP spool is operating within the same speed range as the HP spool. At higher speeds, the spool-selectable transmission 120 may couple the electric machine 118 to the HP spool. In general, when the spool-selectable transmission 120 couples the electric machine 118 to the LP spool or the HP spool can vary depending on the circumstances and the application.

In this example, the spool-selectable transmission 120 can be mechanically coupled to the LP spool via one or more shafts 122 and one or more gears or gearsets 124 (such as at least one LP gear shaft). Similarly, the spool-selectable transmission 120 can be coupled to the HP spool via one or more shafts 126 and one or more gears or gearsets 128 (such as at least one HP gear shaft). The shafts 122, 126 and gears or gearsets 124, 128 can be used to provide rotational motion from the shafts 108, 114 to the electric machine 118 or to provide rotational motion from the electric machine 118 to the shafts 108, 114. However, note that other engine systems may have more than two spools, in which case the spool-selectable transmission 120 may selectively connect the electric machine 118 to those additional spools, as well.

In some embodiments, the spool-selectable transmission 120 may include a single clutch that can be repositioned by a selector fork or other selective actuator, such as when the single clutch can mechanically couple the electric machine 118 to one spool in one position and to another spool in another position. In other embodiments, the spool-selectable transmission 120 may include multiple clutches, each of which can mechanically couple the electric machine 118 to one of the spools. Each embodiment may also support a neutral position in which the electric machine 118 is not coupled to any of the spools As described in more detail below, the spool-selectable transmission 120 may incorporate a number of additional features as needed or desired. For example, the spool-selectable transmission 120 may be configured to speed match at least one clutch to one of the spools and/or include a synchronizer to speed match the electric machine 118 to one of the spools or to speed match two or more of the spools. As another example, the spool-selectable transmission 120 may be integrated in the electric machine 118 itself. As yet another example, the spool-selectable transmission 120 may include one or more position controllers (such as control pistons) and support one or more actuation techniques that are used to control the positioning of one or more clutches within the spool-selectable transmission 120. Various examples of position controller designs and position controller actuation techniques are described in more detail below. As still another example, the spool-selectable transmission 120 may include a rolling element interface between each selector fork or other selective actuator and a corresponding clutch. Various examples of rolling element interfaces are described in more detail below. A number of other features of the spool-selectable transmission 120 are described below, any single one or any combination of which may be incorporated into the spool-selectable transmission 120 and used with the gas turbine engine 100.

Although FIG. 1 illustrates one example of a gas turbine engine 100 having an engine spool-selectable transmission and related components, various changes may be made to FIG. 1. For example, the spool-selectable transmission 120 may be used with any other suitable engines having multiple spools.

Figure 2A:
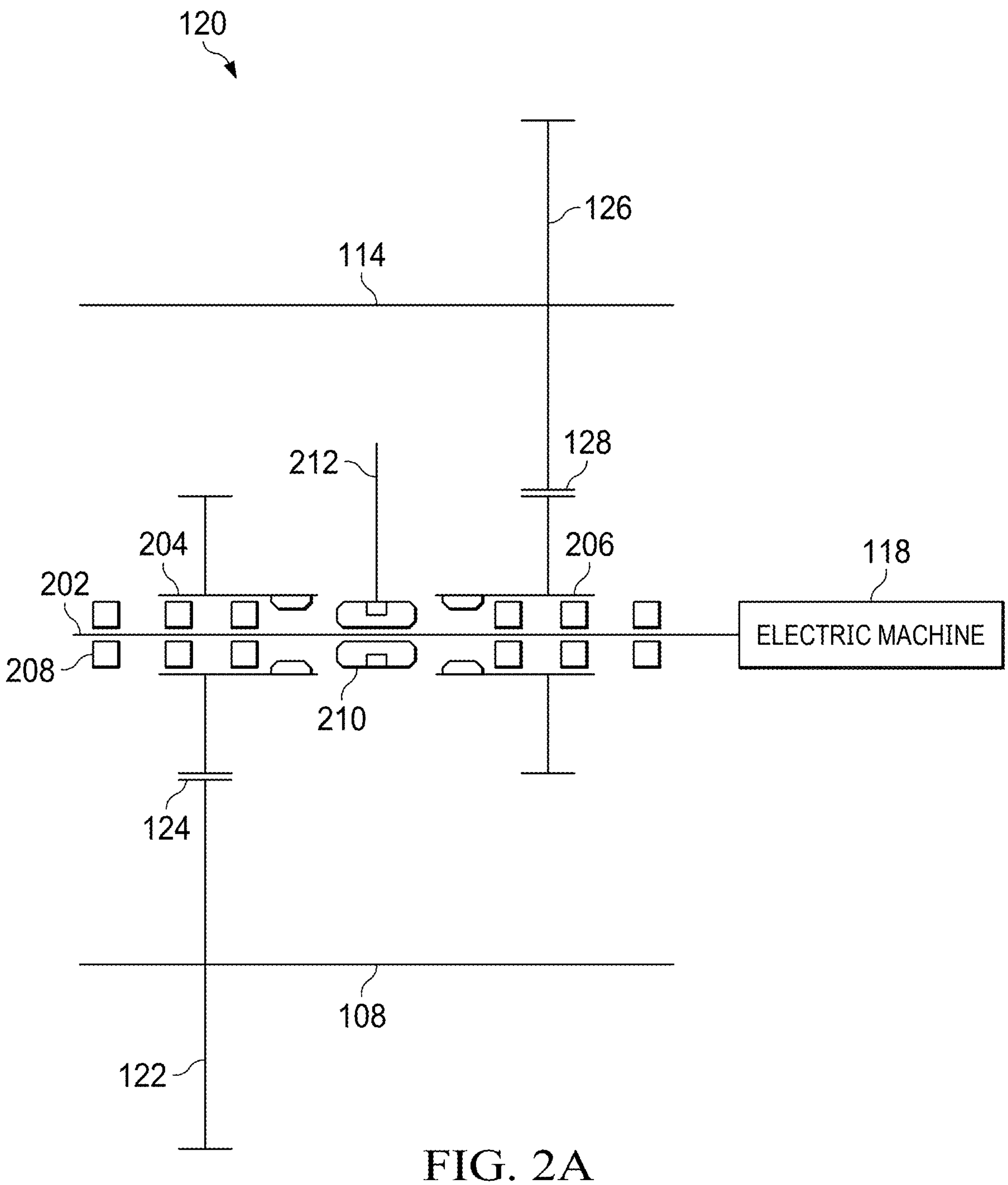
FIGS. 2A through 2C illustrate a first example spool-selectable transmission in accordance with this disclosure.
Figure 2B:
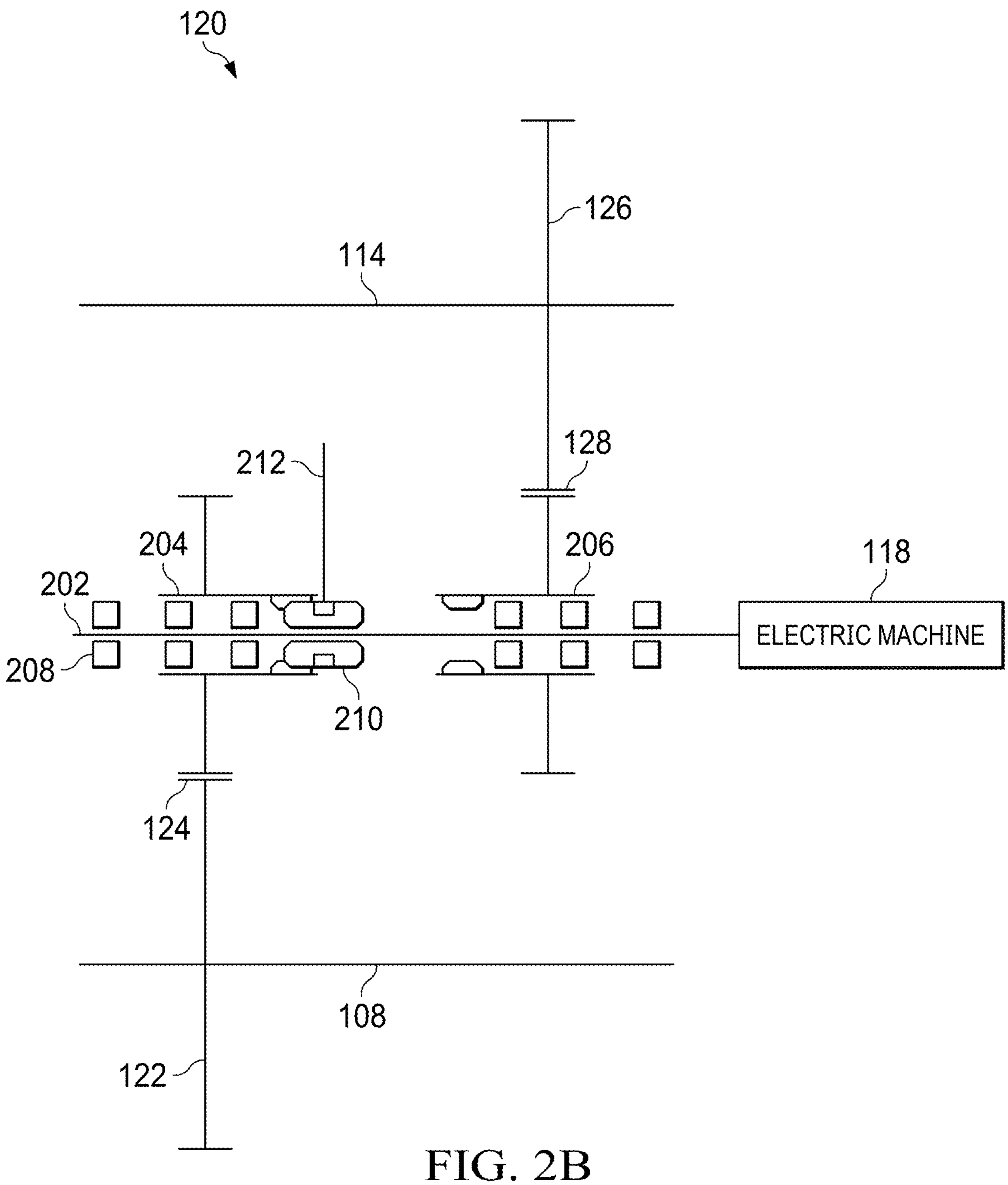
Figure 2C:
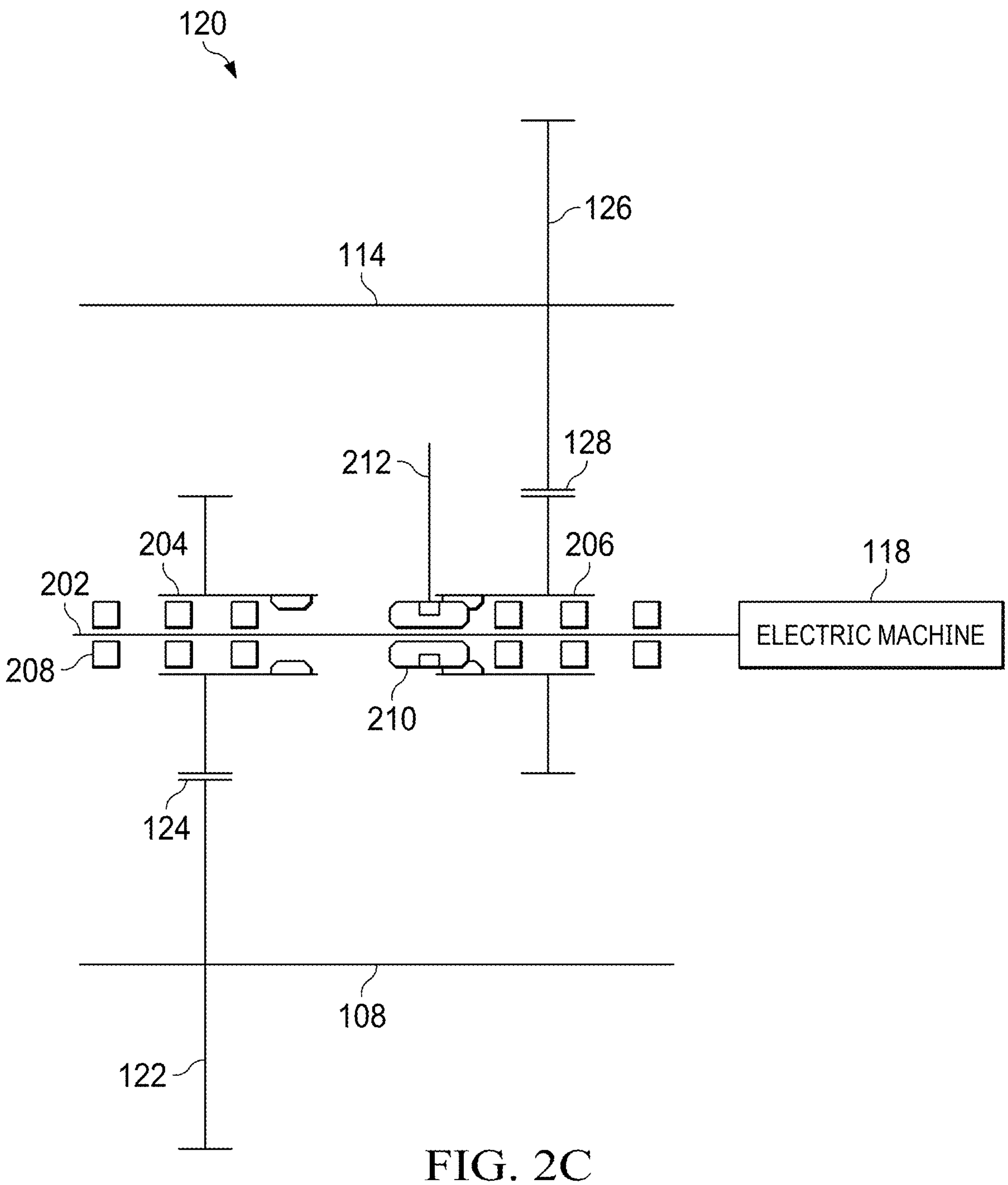

FIGS. 2A through 2C illustrate a first example spool-selectable transmission 120 in accordance with this disclosure. For ease of explanation, the spool-selectable transmission 120 shown in FIGS. 2A through 2C is described as being used in or with the gas turbine engine 100 of FIG. 1. However, the spool-selectable transmission 120 shown in FIGS. 2A through 2C may be used with any suitable engine having multiple spools.

As shown in FIG. 2A, the electric machine 118 includes or is coupled to a mechanical output, such as a shaft 202. The shaft 202 is configured to be driven (rotated) by the electric machine 118 in order to provide mechanical energy to one of the spools of the gas turbine engine 100 and/or to be driven (rotated) by one of the spools of the gas turbine engine 100 in order to provide mechanical energy to the electric machine 118. Two gear shafts 204 and 206 are co-axial with the shaft 202. The gear shaft 204 includes or is associated with one or more gears or gearsets that can drive or be driven by the LP spool, and the gear shaft 206 includes or is associated with one or more gears or gearsets that can drive or be driven by the HP spool. For example, the LP spool can spin the one or more gears or gearsets 124, causing rotation of the gear shaft 204 (or vice versa). Similarly, the HP spool can spin the one or more gears or gearsets 128, causing rotation of the gear shaft 206 (or vice versa). Note that while each gear shaft 204 and 206 is co-axial with the shaft 202, each gear shaft 204 and 206 can ride on bearings 208 and may or may not spin at the same speed as the shaft 202.

In this example, a movable clutch 210 can be moved to engage with each gear shaft 204 and 206 in order to control which of the spools (if any) is driving or being driven by the shaft 202. For example, in some embodiments, the clutch 210 may include splines on its inner diameter and on its outer diameter. The splines on the inner diameter of the clutch 210 can be connected to the shaft 202 so that the clutch 210 rotates at the same speed as the shaft 202. Each of the gear shafts 204 and 206 may also include one or more splines on its inner diameter, and these splines can mate with the spline(s) on the outer diameter of the clutch 210. This allows the clutch 210 to selectively mate with either of the gear shafts 204 and 206 in order to mechanically couple the shaft 202 with either of the spools of the gas turbine engine 100. Note, however, that designs other than spline connections may be used here, such as dog tooth interfaces between each of the gear shafts 204 and 206 and the clutch 210.

A selector fork or other selective actuator 212 is used to move the clutch 210 to one of multiple positions. For example, as described below, the selective actuator 212 may include or be coupled to a control piston or other position controller, which can move the selector fork or other selective actuator 212 into various positions. The selective actuator 212 can slide or otherwise move the clutch 210 into various positions based on movement provided by the position controller, thereby controlling if and how the spool-selectable transmission 120 mechanically couples the shaft 202 to one of the spools of the gas turbine engine 100.

In some embodiments, the selective actuator 212 can be used to move the clutch 210 into at least three positions. As shown in FIG. 2A, the clutch 210 is in a neutral position, meaning the clutch 210 is not engaged with either of the gear shafts 204 and 206. As a result, the shaft 202 does not drive and is not driven by any of the spools of the gas turbine engine 100. As shown in FIG. 2B, the clutch 210 has been moved into a first engaged position where the clutch 210 engages with the gear shaft 204. In this configuration, the shaft 202 drives or is driven by the LP spool of the gas turbine engine 100. As shown in FIG. 2C, the clutch 210 has been moved into a second engaged position where the clutch 210 engages with the gear shaft 206. In that configuration, the shaft 202 drives or is driven by the HP spool of the gas turbine engine 100.

In order to control which spool of the gas turbine engine 100 is driving or being driven by the electric machine 118, the following process may be performed. Assume that the clutch 210 has the position shown in FIG. 2B, meaning the electric machine 118 is driving or being driven by the LP spool of the gas turbine engine 100. To shift the electric machine 118 to drive or to be driven by the HP spool, the electric machine 118 can be commanded to stop generating electrical power, and the selective actuator 212 can move the clutch 210 into the neutral position shown in FIG. 2A. At this point, the speed of the shaft 202 can be matched substantially to the speed of the gear shaft 206. Once adequate speed matching is achieved, the selective actuator 212 can move the clutch 210 into the position shown in FIG. 2C, and the electric machine 118 can begin generating electrical power again. The same process may occur when moving the clutch 210 from the position shown in FIG. 2C to the position shown in FIG. 2B.

As noted above, the speed of the shaft 202 can be matched substantially to the speed of one of the gear shafts 204 or 206 when the clutch 210 is being engaged with that gear shaft 204 or 206. In some embodiments, this can be achieved by controlling the electric machine 118 to operate in a motor mode, such as by controlling the electric machine 118 to speed up or slow down rotation of the shaft 202. In other cases, a synchronizer or other component can be used to achieve this speed match.

Figure 3:
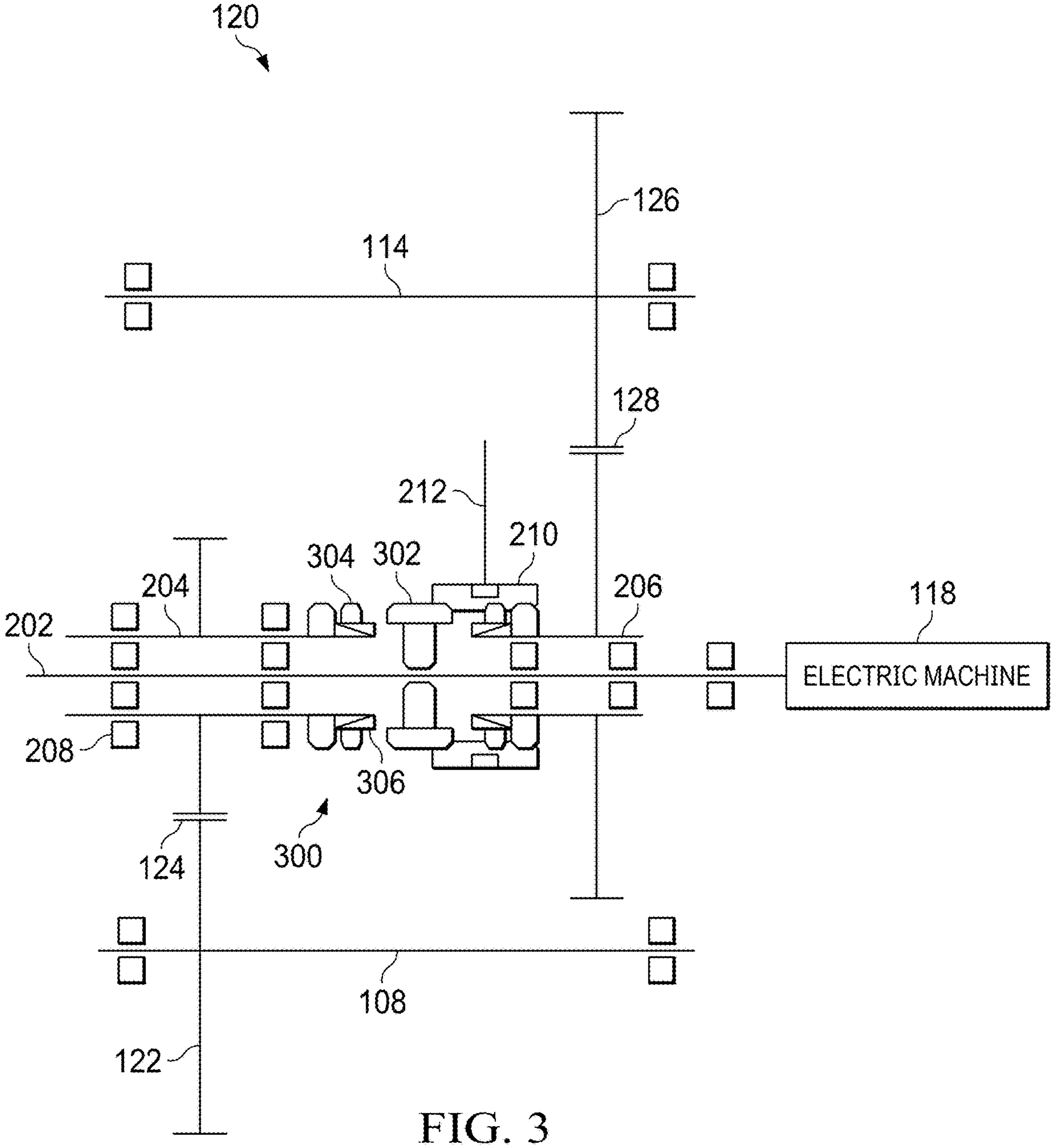
FIG. 3 illustrates a second example spool-selectable transmission in accordance with this disclosure.

FIG. 3 illustrates a second example spool-selectable transmission 120 in accordance with this disclosure. The spool-selectable transmission 120 shown in FIG. 3 is similar to the spool-selectable transmission 120 shown in FIGS. 2A through 2C. For example, the clutch 210 can be moved to the left to engage with the LP spool, moved to the right to engage with the HP spool, or maintained in a neutral position. In FIG. 3, however, the spool-selectable transmission 120 additionally includes a synchronizer assembly 300, which can be used to mechanically match the speed of the shaft 202 with the speed of the LP or HP spool of the gas turbine engine 100.

As shown in FIG. 3, the synchronizer assembly 300 includes a shift sleeve 302, a blocking ring 304, and a cone clutch 306. When the selective actuator 212 moves the clutch 210 and the shift sleeve 302 to the left or right, the shift sleeve 302 can hit the blocking ring 304, which creates friction in the cone clutch 306 that brings the shaft 202 and the gear shaft 204 or 206 to the same rotational speed. Also, the shift sleeve 302 may slide over the spline of the gear shaft 204 or 206, which mechanically connects the associated spool to the electrical machine 118. Note, however, that this is one type of synchronizer assembly and that other types of synchronizer assemblies may be used (such as a multiplate synchronizer).

In the examples shown in FIGS. 2A through 2C and FIG. 3, there is a single clutch 210 and a single selective actuator 212. However, the spool-selectable transmission 120 may include multiple clutches 210, which can be controlled using one or more selective actuators 212.

Figure 4:
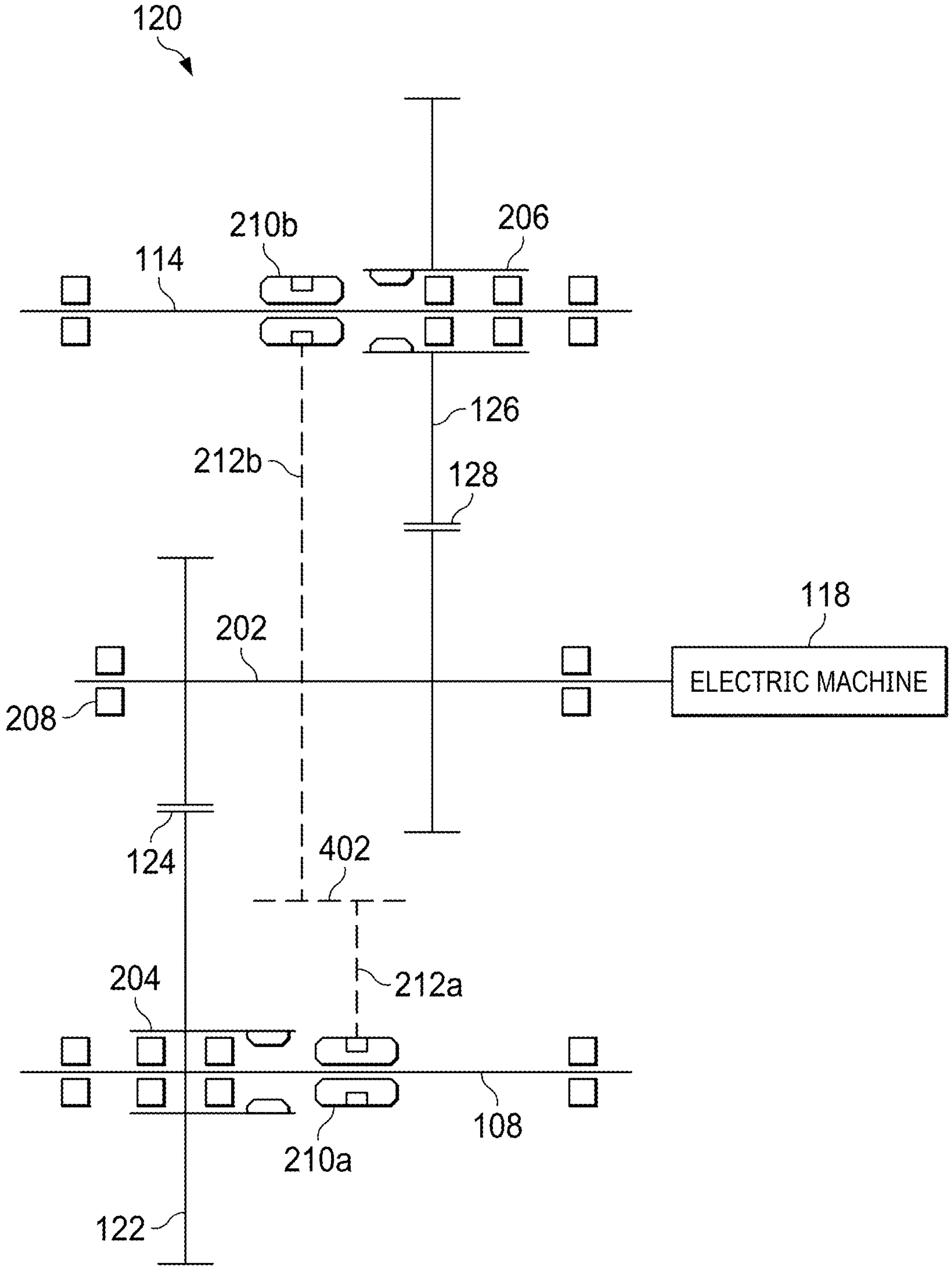
FIG. 4 illustrates a third example spool-selectable transmission in accordance with this disclosure.

FIG. 4 illustrates a third example spool-selectable transmission 120 in accordance with this disclosure. The spool-selectable transmission 120 shown in FIG. 4 is similar to the spool-selectable transmissions 120 shown in FIGS. 2A through 2C and FIG. 3. However, the spool-selectable transmission 120 shown in FIG. 4 positions the gear shafts 204 and 206 coaxial with the shafts 108 and 114, respectively. Also, there are now two clutches 210*a* and 210*b*, one for the shaft 108 and one for the shaft 114, respectively. Similarly, there are now two selective actuators 212*a* and 212*b*, one for the clutch 210*a* and one for the clutch 210*b*, respectively.

In FIG. 4, the shafts 108 and 114 can be used to selectively drive or be driven by the shaft 202, depending on which of the clutches 210*a* and 210*b* (if any) is engaged with the respective spool. The selective actuator 212*a* may be used to position the clutch 210*a* in multiple positions, and the selective actuator 212*b* may be used to position the clutch 210*b* in multiple positions. For example, the selective actuator 212*a* may position the clutch 210*a* in an engaged position in which the clutch 210*a* is mechanically coupled to the gear shaft 204 associated with the LP spool or a neutral position in which the clutch 210*a* is not engaged with the gear shaft 204 associated with the LP spool. Similarly, the selective actuator 212*b* may position the clutch 210*b* in an engaged position in which the clutch 210*b* is mechanically coupled to the gear shaft 206 associated with the HP spool or a neutral position in which the clutch 210*b* is not engaged with the gear shaft 206 associated with the HP spool.

In this example, both of the selective actuators 212*a*-212*b* can be coupled to a common position controller 402, such as a common control piston. The position controller 402 may move the selective actuators 212*a*-212*b* together so that only one clutch 210*a* or 210*b* is ever engaged with its corresponding gear shaft 204 or 206 at any given time. That is, either both clutches 210*a* and 210*b* are in their associated neutral positions, or one clutch 210*a* or 210*b* is engaged with its corresponding gear shaft 204 or 206 while the other clutch 210*b* or 210*a* is in its associated neutral position.

Figure 5:
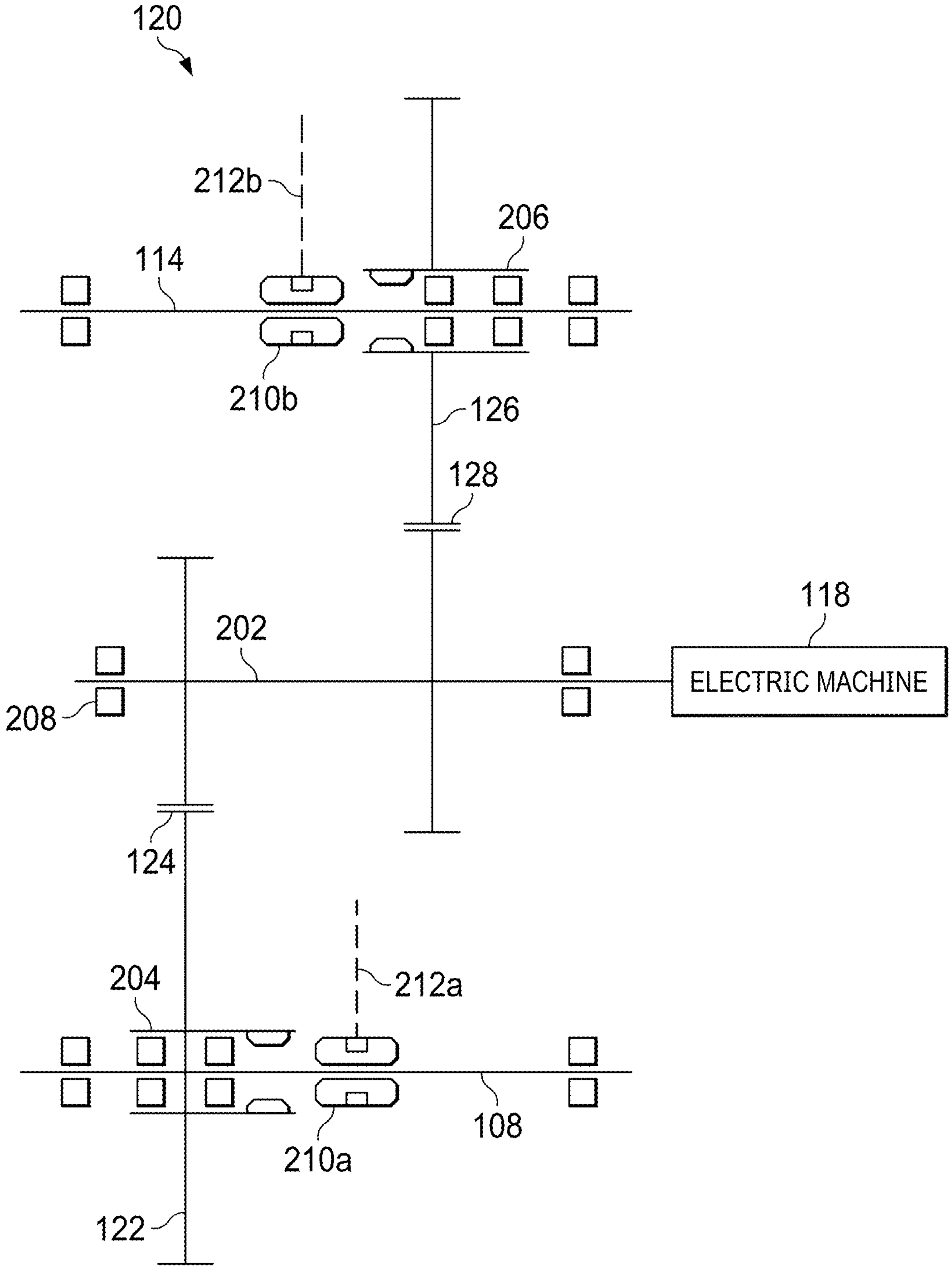
FIG. 5 illustrates a fourth example spool-selectable transmission in accordance with this disclosure.

FIG. 5 illustrates a fourth example spool-selectable transmission 120 in accordance with this disclosure. The spool-selectable transmission 120 shown in FIG. 5 is similar to the spool-selectable transmissions 120 shown in FIG. 4. However, the spool-selectable transmission 120 shown in FIG. 5 includes two selective actuators 212*a* and 212*b* for the two clutches 210*a* and 210*b*, where the selective actuators 212*a* and 212*b* are independently controllable. In other words, the selective actuator 212*a* is allowed to control the position of the clutch 210*a* between its neutral and engaged positions, and the selective actuator 212*b* is allowed to control the position of the clutch 210*b* between its neutral and engaged positions. The two selective actuators 212*a*-212*b* may have their own control pistons or other position controllers, meaning the adjustment to the position of one does not necessarily require adjustment to the position of the other. However, control logic or other mechanisms may be used to prevent both spools from being mechanically coupled to the shaft 202 at the same time.

With respect to FIGS. 4 and 5, it should be noted that while the gear shafts 204 and 206 are shown as being coaxial with the shafts 108 and 114, respectively, this need not be the case. For example, in other embodiments, one of the gear shafts 204 and 206 may be coaxial with the shaft 202 (similar to FIGS. 2A through 2C), and the associated clutch

210*a* or 210*b* may be moveable along the shaft 202. Thus, the specific positions of the clutches 210*a*, 210*b* and gear shafts 204, 206 can vary depending on the implementation.

Figure 6:
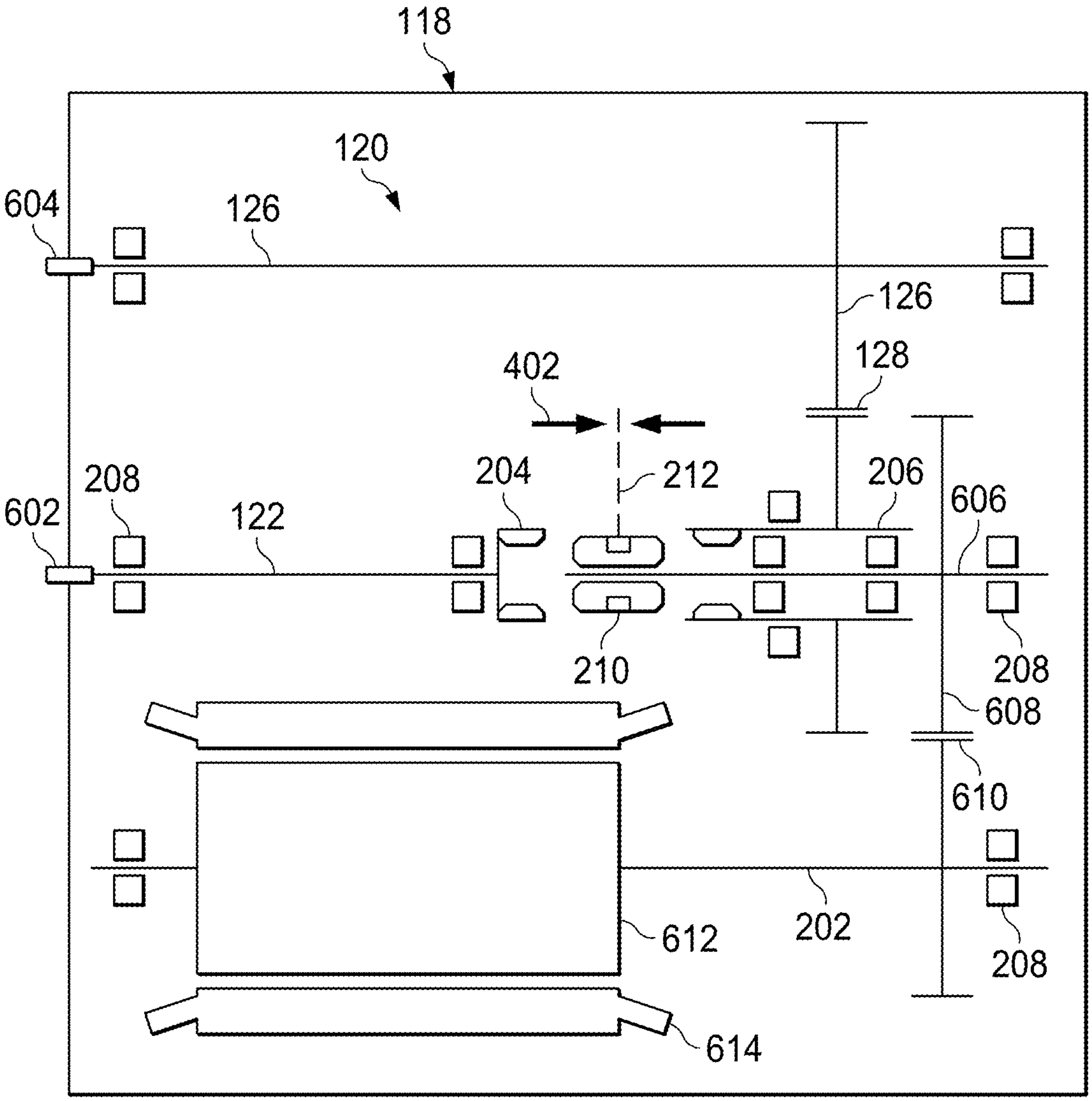
FIG. 6 illustrates a fifth example spool-selectable transmission in accordance with this disclosure.

In the examples shown in FIGS. 2A through 5, the spool-selectable transmission 120 has been shown as being a separate stand-alone component. However, this need not be the case. FIG. 6 illustrates a fifth example spool-selectable transmission 120 in accordance with this disclosure. In this example, the spool-selectable transmission 120 is integrated into the electric machine 118 itself. To accomplish this integration, the electric machine 118 includes a first input/output 602 configured to receive rotational input from or provide rotational output to the LP spool. The electric machine 118 also includes a second input/output 604 configured to receive rotational input from or provide rotational output to the HP spool. The inputs/outputs 602 and 604 are mechanically coupled to the gear shafts 204 and 206, respectively, and the clutch 210 can engage with either (or neither) of the gear shafts 204 and 206.

In this example, the clutch 210 is mechanically coupled to a shaft 606, which can rotate between bearings 208. When the electric machine 118 is being driven, rotation of the shaft 606 can cause corresponding rotation of a shaft 608, which includes one or more gears or gearsets 610 (such as one or more gear meshes). Rotation of the shaft 608 can cause corresponding rotation of the shaft 202, which in this example is coupled to a rotor 612 of the electric machine 118. The rotor 612 is configured to spin within a stator 614 of the electric machine 118 in order to generate electrical power. When the electric machine 118 is driving one of the spools of the gas turbine engine 100, the rotor 612 can cause rotation of the shaft 202, rotating the shafts 608, 606 and one of the shafts 122, 126.

In some embodiments, the clutch 210 here may be positioned in the same types of positions as shown in FIGS. 2A through 2C. Thus, for example, the clutch 210 may have a neutral position as shown in FIG. 6, where the clutch 210 is not engaged with either gear shaft 204 or 206. The position controller 402 can move the clutch 210 to the left into a first engaged position in which the clutch 210 engages with the gear shaft 204, thereby allowing the rotor 614 to drive or be driven by the LP spool of the gas turbine engine 100. The position controller 402 can also move the clutch 210 to the right into a second engaged position in which the clutch 210 engages with the gear shaft 206, thereby allowing the rotor 614 to drive or be driven by the HP spool of the gas turbine engine 100.

As noted above, in some embodiments, the electric machine 118 may include or be used as an engine starter, such as to help start the gas turbine engine 100. In some cases, engine start may be performed by mechanically coupling the electric machine 118 to the HP spool of the gas turbine engine 100. The electric machine 118 can be operated to produce rotational motion of the shaft 202, which causes rotational motion of the shaft(s) 126 to help provide mechanical energy to the HP spool of the gas turbine engine 100 during engine startup. Note that the engine start functionality may also be used with the LP spool of the gas turbine engine 100 in some cases. Also note that there may be additional spools of a gas turbine engine that could be started.

In the example shown in FIG. 6, the spool-selectable transmission 120 is shown as being integrated into an electric machine 118 having a specific form. However, other forms of the electric machine 118 may be used here. Also, the spool-selectable transmission 120 may be implemented in any other suitable manner. For example, rather than being integrated with the electric machine 118, the spool-selectable transmission 120 may be integrated into a gearbox, implemented as a separate line replaceable unit (LRU), or implemented in any other suitable manner.

Although FIGS. 2A through 6 illustrate various examples of spool-selectable transmissions 120, various changes may be made to FIGS. 2A through 6. For example, the various components within each spool-selectable transmission 120 can be arranged in any suitable manner. In general, it is possible to use a variety of shafts, gears/gear sets, and/or other components to mechanically couple a spool-selectable transmission 120 to multiple spools of an engine and to mechanically transfer rotational energy to, from, or within a spool-selectable transmission 120. While specific arrangements of components are shown in FIGS. 2A through 6, these specific arrangements are for illustration and explanation only. Similarly, there are various ways in which a spool-selectable transmission 120 may be integrated into a generator or other electric machine 118 (if integration is desired). While a specific arrangement of components is shown in FIG. 6, this specific arrangement is for illustration and explanation only.

Figure 7A:
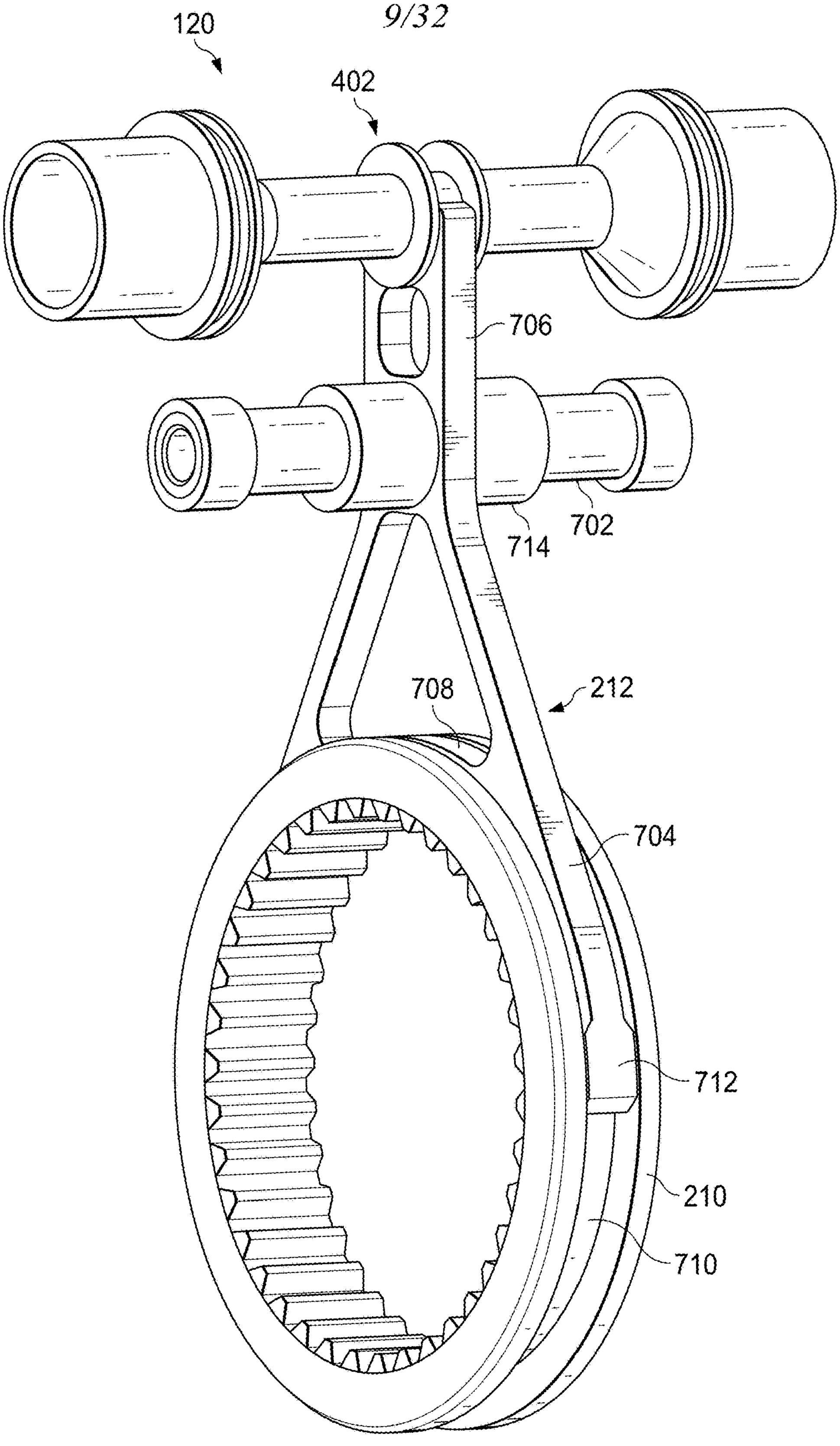
FIGS. 7A and 7B illustrate perspective views of portions of example spool-selectable transmissions in accordance with this disclosure.
Figure 7B:
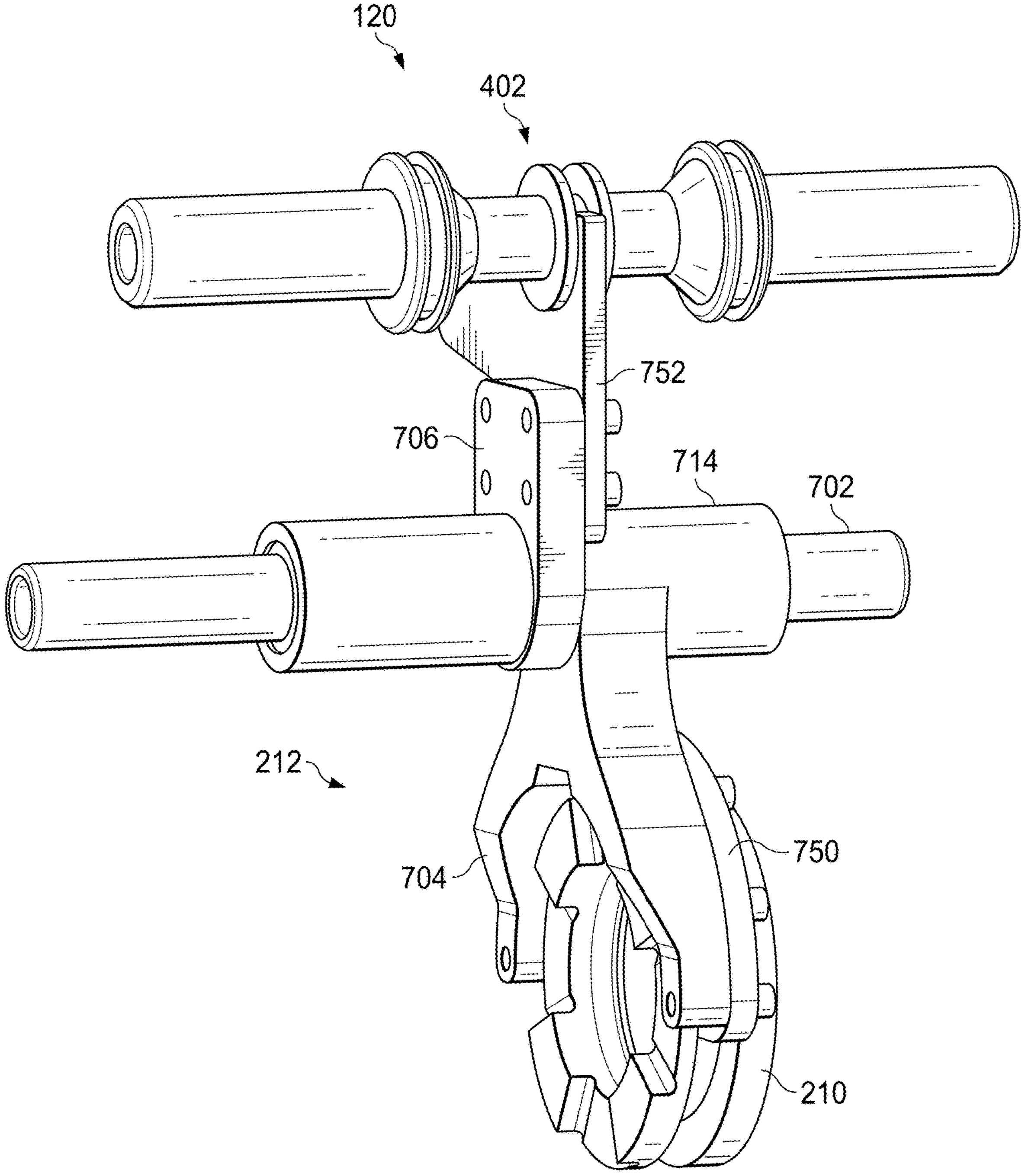

FIGS. 7A and 7B illustrate perspective views of portions of example spool-selectable transmissions 120 in accordance with this disclosure. The example spool-selectable transmissions 120 shown in FIGS. 7A and 7B may be used in any of the spool-selectable transmissions 120 described above with respect to FIGS. 1 through 6 or any other spool-selectable transmissions designed in accordance with the teachings of this disclosure.

As shown in FIG. 7A, the spool-selectable transmission 120 here includes the clutch 210, the selective actuator 212, the position controller 402, and a guide rod 702. In this example, the clutch 210 represents a circular structure with splines along the inner diameter of the circular structure. The clutch 210 can be moved by the spool-selectable transmission 120 so that the splines engage with a selected one of multiple gear shafts 204, 206 in order to engage the spool-selectable transmission 120 with one of the spools of the gas turbine engine 100. The clutch 210 can also be moved by the spool-selectable transmission 120 into a neutral position.

The selective actuator 212 here takes the form of a selector fork, which in this example includes two arms 704 that extend from a connecting arm 706. The two arms 704 are connected by a curved arch 708. Portions of the arms 704 and the curved arch 708 contact the outer edge of the clutch 210. For example, the portions of the arms 704 and the curved arch 708 may fit within a groove 710 along the outer edge of the clutch 210. At least tips 712 of the arms 704 may be sized so as to be retained within and remain adjacent to the groove 710.

The connecting arm 706 of the selector fork is attached to the position controller 402, which in this example takes the form of or includes a control piston that can move back and forth. The guide rod 702 can extend through the connecting arm 706 of the selector fork, such as through a hollow shaft 714 positioned along the connecting arm 706. The guide rod 702 can be fixed in place, so the connecting arm 706 of the selector fork is restrained in its movements and can only slide back and forth along the guide rod 702. As a result, the selector fork can only move linearly back and forth, and rotation of the selector fork can be prevented.

As shown in FIG. 7B, the spool-selectable transmission 120 here includes the clutch 210, the selective actuator 212, the position controller 402, and the guide rod 702. However, the form of the selector fork forming the selective actuator 212 is somewhat different. For instance, the arms 704 of the selector fork do not contact the clutch 210 directly. Rather, the selector fork includes an intermediate coupler 750, which attaches the arms 704 of the selector fork to the clutch 210. Also, the selector fork includes an intermediate coupler 752 that can be attached to the position controller 402.

In some embodiments, the interface between the selective actuator 212 and the clutch 210 can represent a rolling element interface. Example types of rolling element interfaces that could be used here include a ball bearing interface, a roller bearing interface, a ball thrust bearing interface, a roller thrust bearing interface, or a tapered roller bearing interface. Specific examples of rolling element interfaces that may be used with the clutch 210 and the selective actuator 212 are provided below. Also, in some embodiments, the position controller 402 may be controlled using one or more actuation techniques. Specific examples of actuation techniques that may be used with the position controller 402 are provided below.

Although FIGS. 7A and 7B illustrate perspective views of portions of example spool-selectable transmissions 120, various changes may be made to FIGS. 7A and 7B. For example, the specific forms of the clutch 210, selective actuator 212, position controller 402, and guide rod 702 shown here are for illustration and explanation only. Also, features in one of FIGS. 7A and 7B may be used in the other of FIGS. 7A and 7B.

As can be understood in the example of FIG. 7, once the selective actuator 212 and the clutch 210 have been moved into an engaged position, the clutch 210 can rotate along with an engaged gear shaft 204 or 206, while the selective actuator 212 can be stationary. This can create a sliding interface that has the potential for wear. Replacing this sliding interface with a rolling element interface can help to convert this sliding motion into rolling motion, which can significantly reduce the wear on this interface. This can be particularly useful since the interface between a clutch and a selective actuator may be a difficult interface to design, such as in terms of achieving suitable friction, providing adequate lubrication, and reducing wear. Using a rolling element interface here can therefore significantly simplify the design of this interface.

The following now describes example embodiments of rolling element interfaces that may be used with a clutch 210 and a selective actuator 212. Note that while various features are shown in the following embodiments, any suitable combination of features shown in these embodiments could be used together in a single device, whether or not that specific combination of features is shown in the figures or described. Also note that the rolling element interfaces are described below as being used in conjunction with a clutch 210 and a selective actuator 212 within a spool-selectable transmission 120. However, the rolling element interfaces described below may be used in conjunction with any suitable clutch and associated selective actuator, whether or not used in a spool-selectable transmission 120.

Figure 8A:
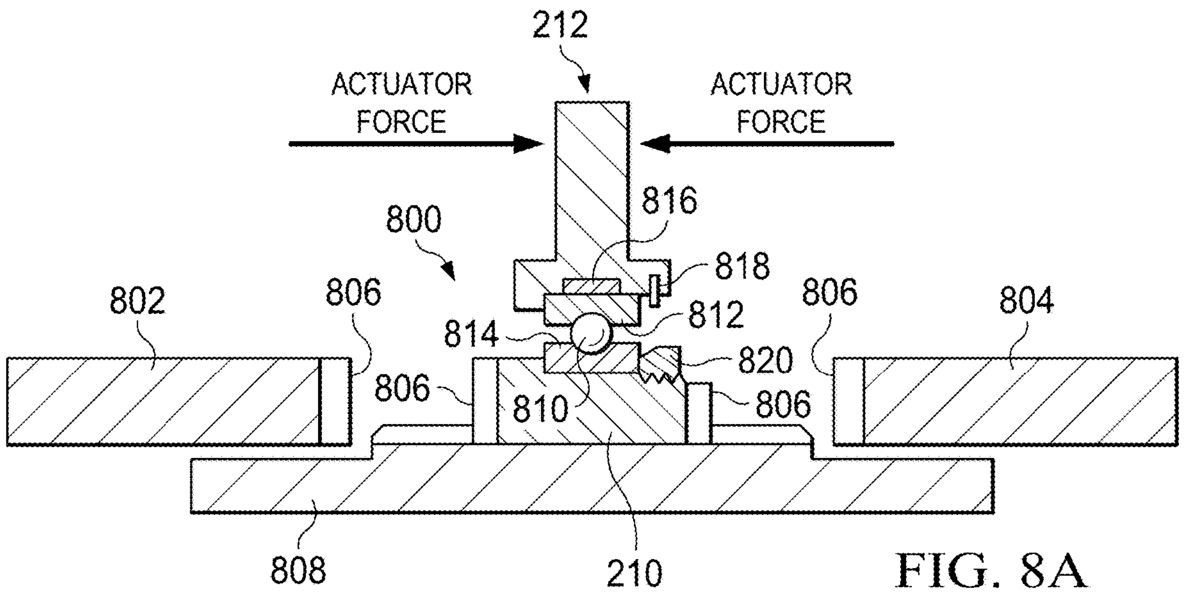
FIGS. 8A through 8D illustrate a first example rolling element interface between a clutch and a selective actuator in accordance with this disclosure.

FIGS. 8A through 8D illustrate a first example rolling element interface 800 between a clutch 210 and a selective actuator 212 in accordance with this disclosure. As shown in FIG. 8A, the clutch 210 can be moved between various positions, including a position in which the clutch 210 can engage with a first connecting member 802 and a position in which the clutch 210 can engage with a second connecting member 804. In some cases, the first connecting member 802 may represent one of the gear shafts 204 and 206, and the second connecting member 804 may represent another of the gear shafts 204 and 206. The clutch 210 can also be moved to a neutral position.

The clutch 210 and the connecting members 802 and 804 include interfaces 806 that allow the clutch 210 to engage with the connecting members 802 and 804. Any suitable types of interfaces 806 may be used here, such as splined clutch interfaces or dog tooth clutch interfaces. In this example, the clutch 210 is shown as moving along a base 808, such as one of the shafts 202, 108, 114, 122, 126, 606, which can have a spline interface or other interface with the clutch 210.

In this example, a selector fork or other selective actuator 212 can be used to move the clutch 210 left or right in response to an actuator force, such as a force applied by a control piston or other position controller 402. However, rather than contacting the clutch 210 directly, a rolling element interface is used between the selective actuator 212 and the clutch 210. Here, the rolling element interface is formed using rolling element bearings 810 that are positioned between an outer race 812 and an inner race 814. The outer race 812 can rotate relative to the inner race 814 on the bearings 810, allowing the selective actuator 212 to have a rolling interface (rather than a sliding interface) along the clutch 210.

Figure 8B:
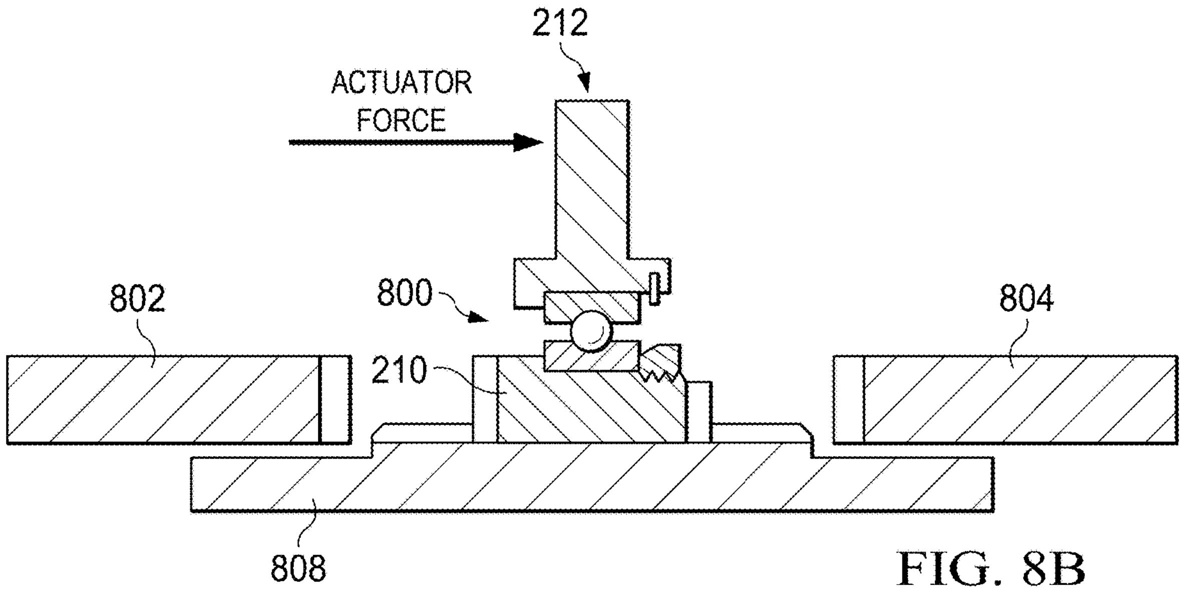
Figure 8C:
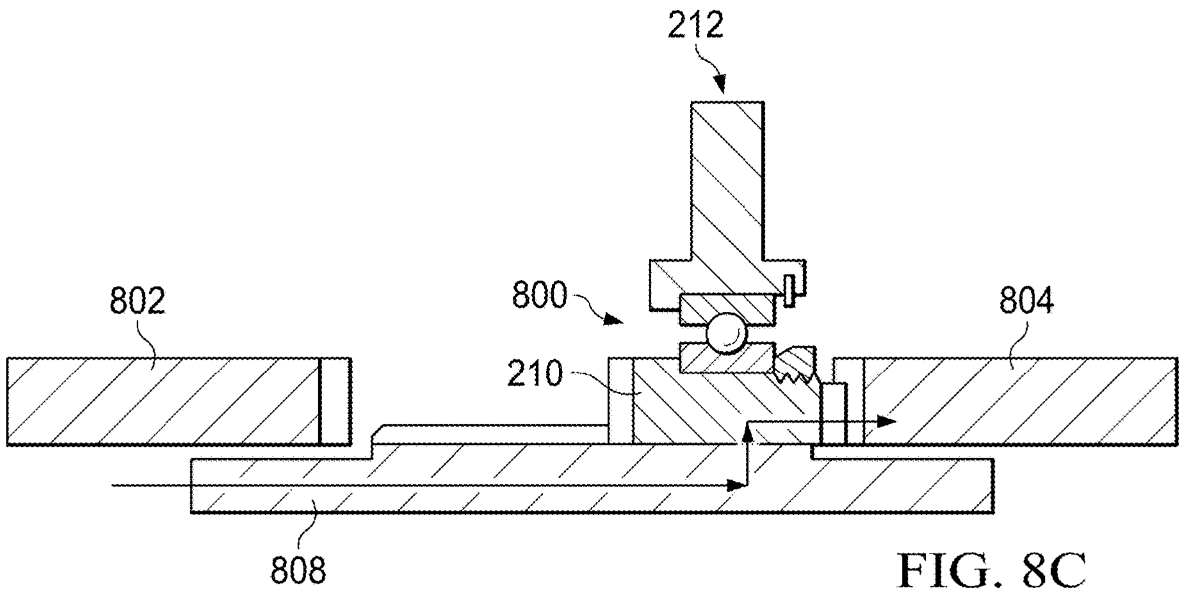

As an example of the operation of the clutch 210 and the selective actuator 212, as shown in FIGS. 8B and 8C, a position controller 402 applies an actuator force to the right. The actuator force moves the selective actuator 212 to the right, which applies a force to the bearings 810. The bearings 810 apply a force to the clutch 210, moving the clutch 210 from a neutral position (FIG. 8B) into an engaged position (FIG. 8C). In this engaged position, the clutch 210 has engaged with the connecting member 804, which can transfer torque from the spline(s) or other interface of the base 808, through the clutch 210, and into the connecting member 804. Once in the engaged position, the actuator force can be removed from the selective actuator 212. A similar actuator force applied by the position controller 402 to the left can move the clutch 210 into another engaged position in which the clutch 210 engages with the connecting member 802. Actuator forces can also be applied to move the clutch 210 from either of its engaged positions back to a neutral position.

A number of additional features may be used with the rolling element interface 800 here, and any individual feature or combination of features (or none of these features) may be used in any specific embodiment. As one example, an anti-rotation mechanism 816 may be used to limit or prevent rotation of the selective actuator 212 relative to the rolling element interface 800. In this example, the anti-rotation mechanism 816 takes the form of a keyway, which can represent a projection that extends from the outer race 812 into a recess of the selective actuator 212 (although the projection may extend from the selective actuator 212 into a recess of the outer race 812). However, other structures that can limit or prevent rotation of the selective actuator 212 relative to the rolling element interface 800 may be used here.

As another example, an axial retainer 818 may be used to help keep the selective actuator 212 in contact with the outer race 812 and keep the selective actuator 212 from slipping off the outer race 812 laterally. In this example, the axial retainer 818 takes the form of a retaining ring. However, other structures that can limit or prevent slippage of the selective actuator 212 off the outer race 812 may be used here. As yet another example, a locknut 820 may be used to secure the inner race 814 to the clutch 210. In some cases, the locknut 820 may provide a specified amount of preload to the inner race 814. However, other structures that can secure the inner race 814 to the clutch 210 may be used here.

Figure 8D:
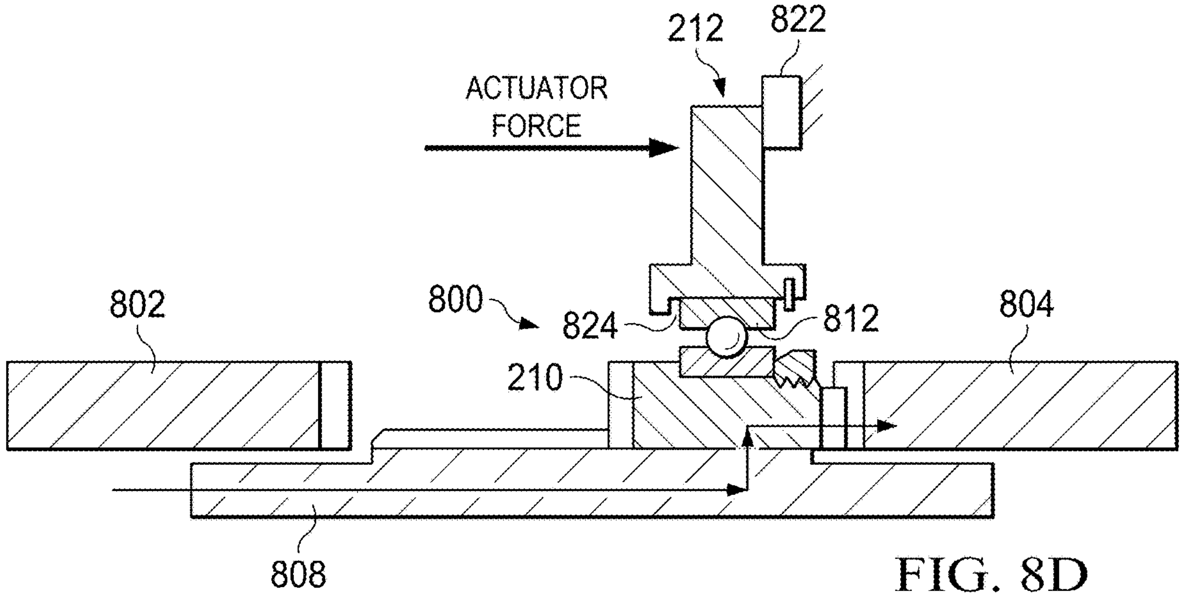

As still another example, as shown in FIG. 8D, a physical stop 822 may be positioned above or otherwise in association with each connecting member 802, 804. When the selective actuator 212 is driven into one of its engaged positions, the clutch 210 can engage with the corresponding connecting member 802 or 804. However, the selective actuator 212 can be driven into the physical stop 822, and a small amount of lateral clearance 824 can remain between the outer race 812 and the selective actuator 212. This helps to prevent application of excessive force from the selective actuator 212 to the rolling element interface 800.

Figure 9:
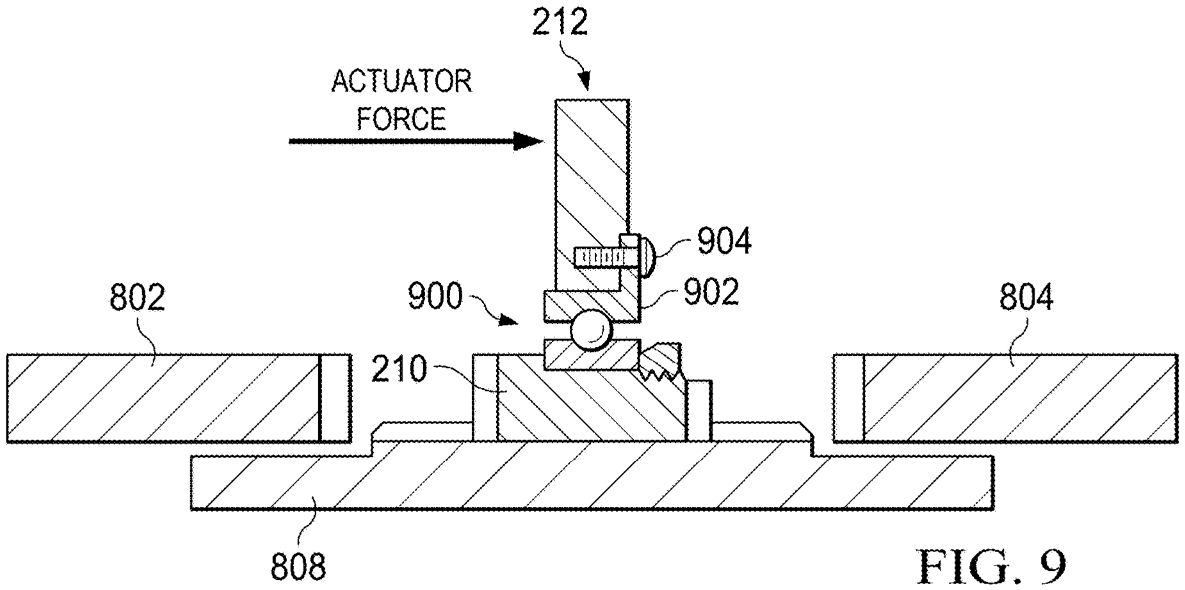
FIG. 9 illustrates a second example rolling element interface between a clutch and a selective actuator in accordance with this disclosure.

FIG. 9 illustrates a second example rolling element interface 900 between a clutch 210 and a selective actuator 212 in accordance with this disclosure. As shown in FIG. 9, the rolling element interface 900 is similar to the rolling element interface 800 shown in FIGS. 8A through 8D. However, in this example, the rolling element interface 900 includes an outer race 902 having a flange, and the flange can be secured to the selective actuator 212 via one or more screws 904 or other mechanisms. This helps to secure the selective actuator 212 to the rolling element interface 900, which can also help to reduce or prevent rotation of the selective actuator 212 relative to the rolling element interface 900.

Figure 10A:
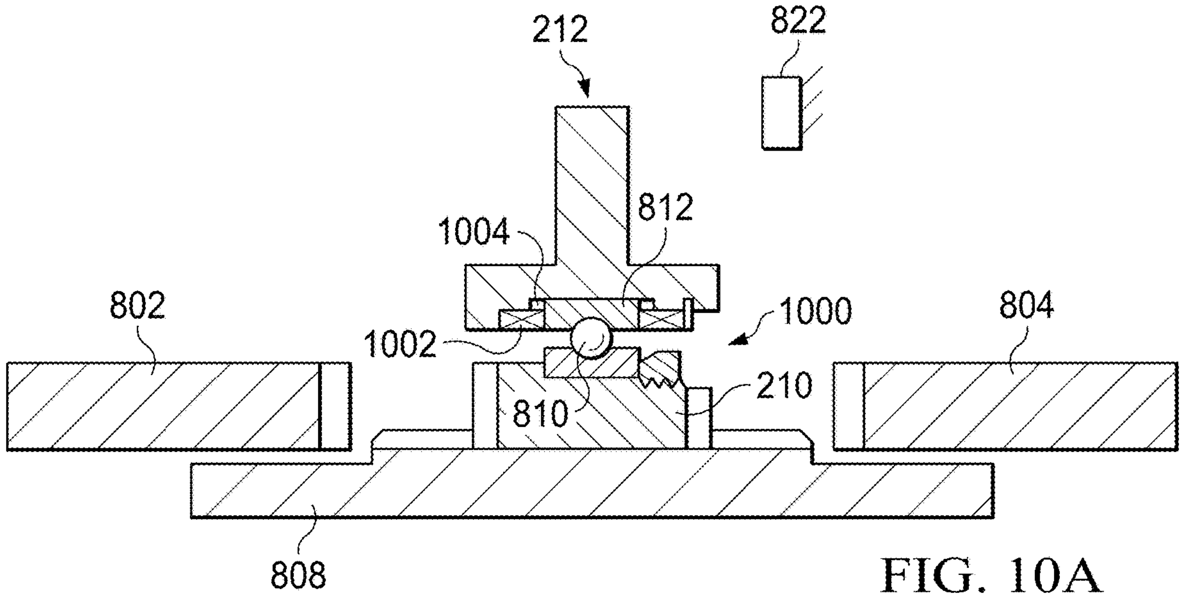
FIGS. 10A and 10B illustrate a third example rolling element interface between a clutch and a selective actuator in accordance with this disclosure.
Figure 10B:
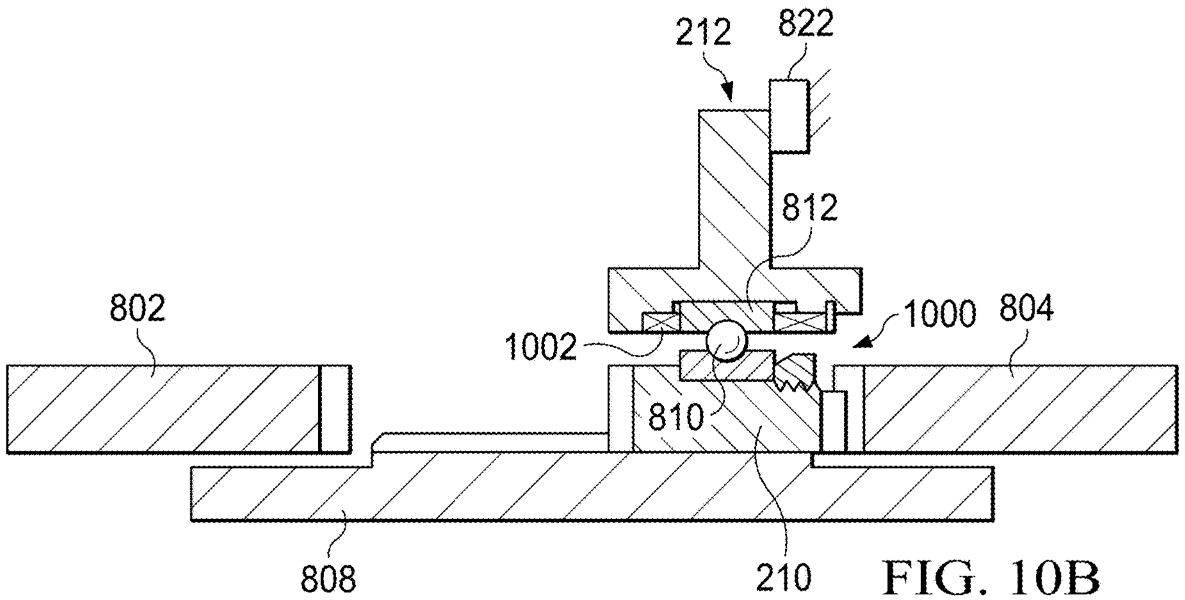

FIGS. 10A and 10B illustrate a third example rolling element interface 1000 between a clutch 210 and a selective actuator 212 in accordance with this disclosure. As shown in FIGS. 10A and 10B, the rolling element interface 1000 is similar to the rolling element interface 800 shown in FIGS. 8A through 8D. However, in this example, preload springs 1002 are positioned laterally between the selective actuator 212 and the outer race 812, and gaps 1004 can exist laterally between the outer race 812 and the selective actuator 212. The preload springs 1002 can be used to provide a reduced or minimal amount of load when connected to the outer race 812. When using a physical stop 822 or other axial travel limiter, movement of the selective actuator 212 may be restricted so that neither of the preload springs 1002 is compressed to a solid height. As can be seen in FIG. 10B, for example, when the selective actuator 212 moves the clutch 210 into one of its engaged positions, the preload springs 1002 can be used to provide a small axial load to the bearings 810, which can generally help with bearing life (in comparison to no load).

Figure 11:
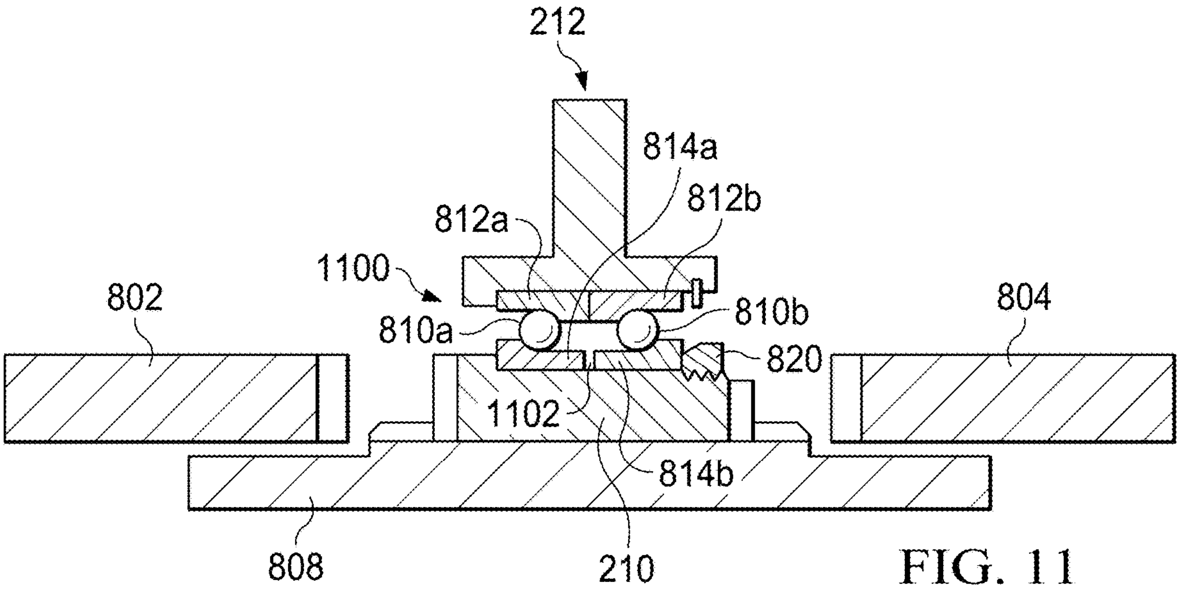
FIG. 11 illustrates a fourth example rolling element interface between a clutch and a selective actuator in accordance with this disclosure.

FIG. 11 illustrates a fourth example rolling element interface 1100 between a clutch 210 and a selective actuator 212 in accordance with this disclosure. As shown in FIG. 11, the rolling element interface 1100 is similar to the rolling element interface 800 shown in FIGS. 8A through 8D. However, in this example, the rolling element interface 1100 includes multiple outer races 812*a*-812*b* and multiple inner races 814*a*-814*b*. Each outer race 812*a*-812*b* can be separated from and rotate relative to a corresponding one of the inner races 814*a*-814*b* on respective bears 810*a*-810*b*. The locknut 820 in this example may provide a specified amount of preload to the inner race(s) 814*a*-814*b*. If desired, a gap 1102 may exist between the inner races 814*a*-814*b*. In some embodiments, the presence of multiple outer races 812*a*-812*b* and multiple inner races 814*a*-814*b* separated by different bearings 810*a*-810*b* helps the rolling element interface 1100 to more easily handle a combination of radial and axial loads.

Although FIGS. 8A through 11 illustrate various examples of rolling element interfaces between a clutch 210 and a selective actuator 212, various changes may be made to FIGS. 8A through 11. For example, while the connecting members 802 and 804 are described above as being used to provide mechanical torque or power to/from spools of an engine, the connecting members 802 and 804 may be used to provide mechanical torque or power to/from any other suitable structures. Also, as noted earlier, any suitable combinations of features shown in FIGS. 8A through 11 may be used in a rolling element interface, even if that particular combination is not shown here. Thus, for instance, multiple outer races and multiple inner races may be used in any of FIGS. 8A through 10B.

The following now describes example embodiments of position controllers 402 and actuation techniques that may be used with a clutch 210 and a selective actuator 212. Note that while various features are shown in the following embodiments, any suitable combination of features shown in these embodiments could be used together in a single device, whether or not that specific combination of features is shown in the figures or described. Also note that the position controllers 402 and associated actuation techniques are described below as being used in conjunction with a clutch 210 and a selective actuator 212 within a spool-selectable transmission 120. However, the position controllers 402 and associated actuation techniques described below may be used in conjunction with any suitable clutch and associated selective actuator, whether or not used in a spool-selectable transmission 120.

Figure 12A:
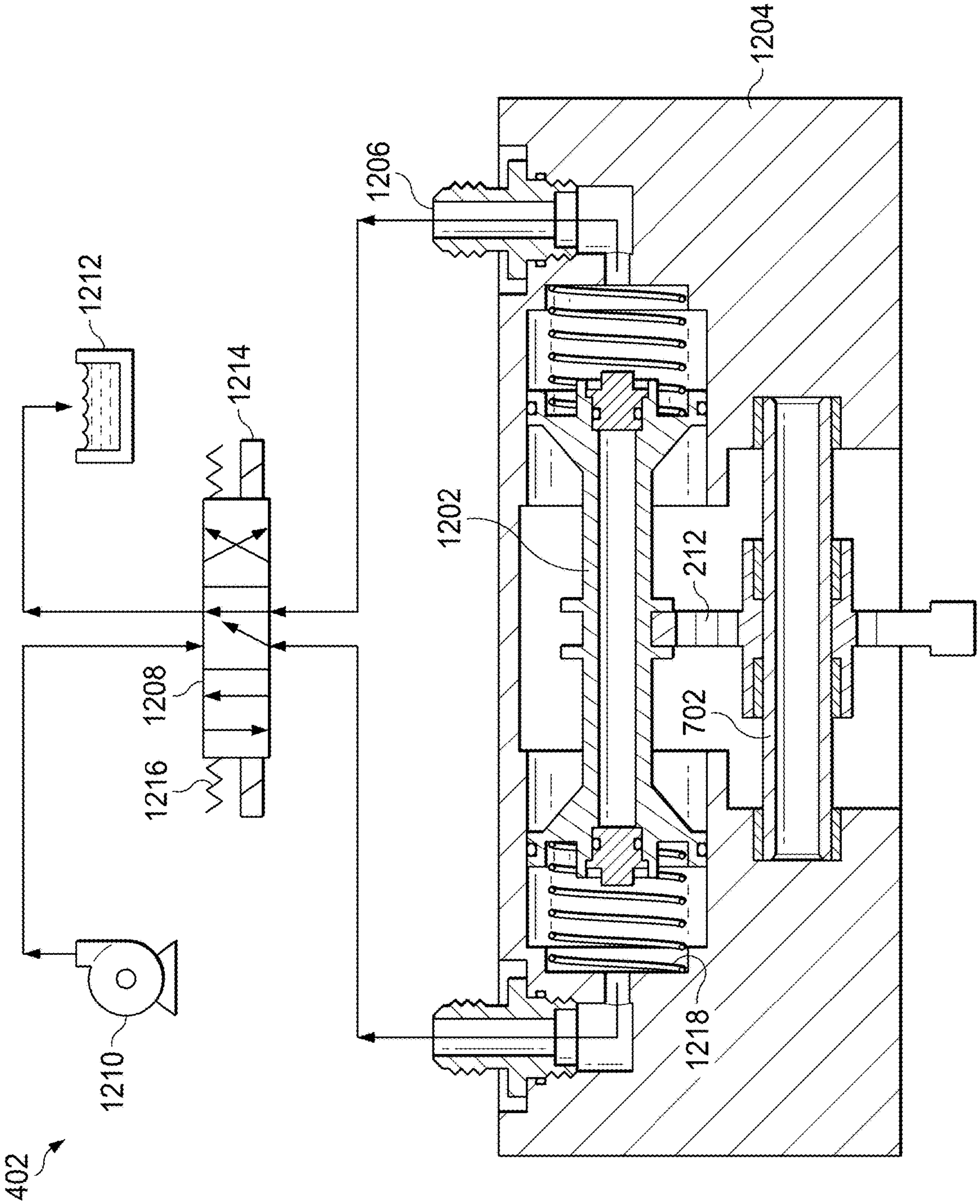
FIGS. 12A through 12C illustrate a first example position controller for a clutch and a selective actuator in accordance with this disclosure.
Figure 12B:
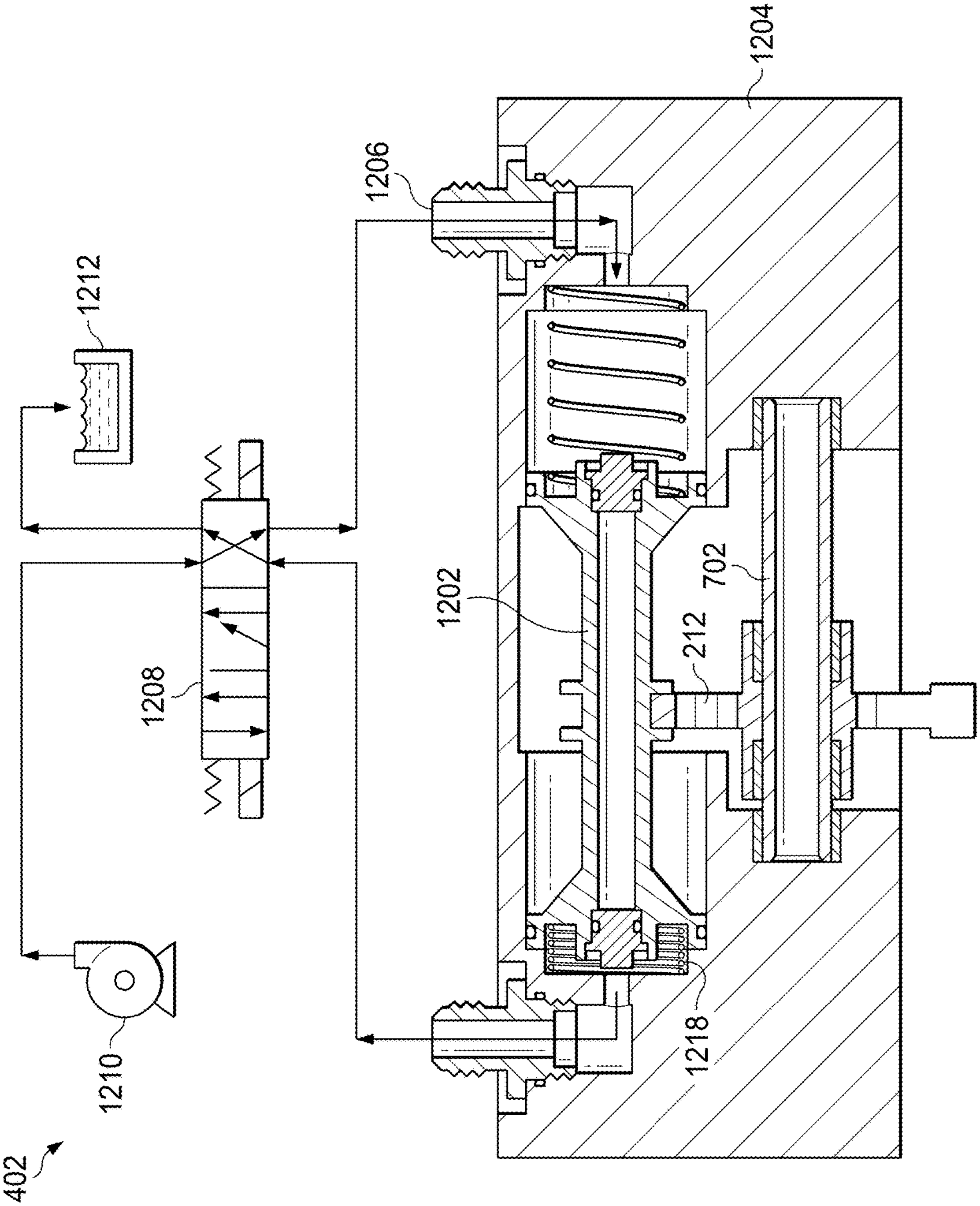
Figure 12C:
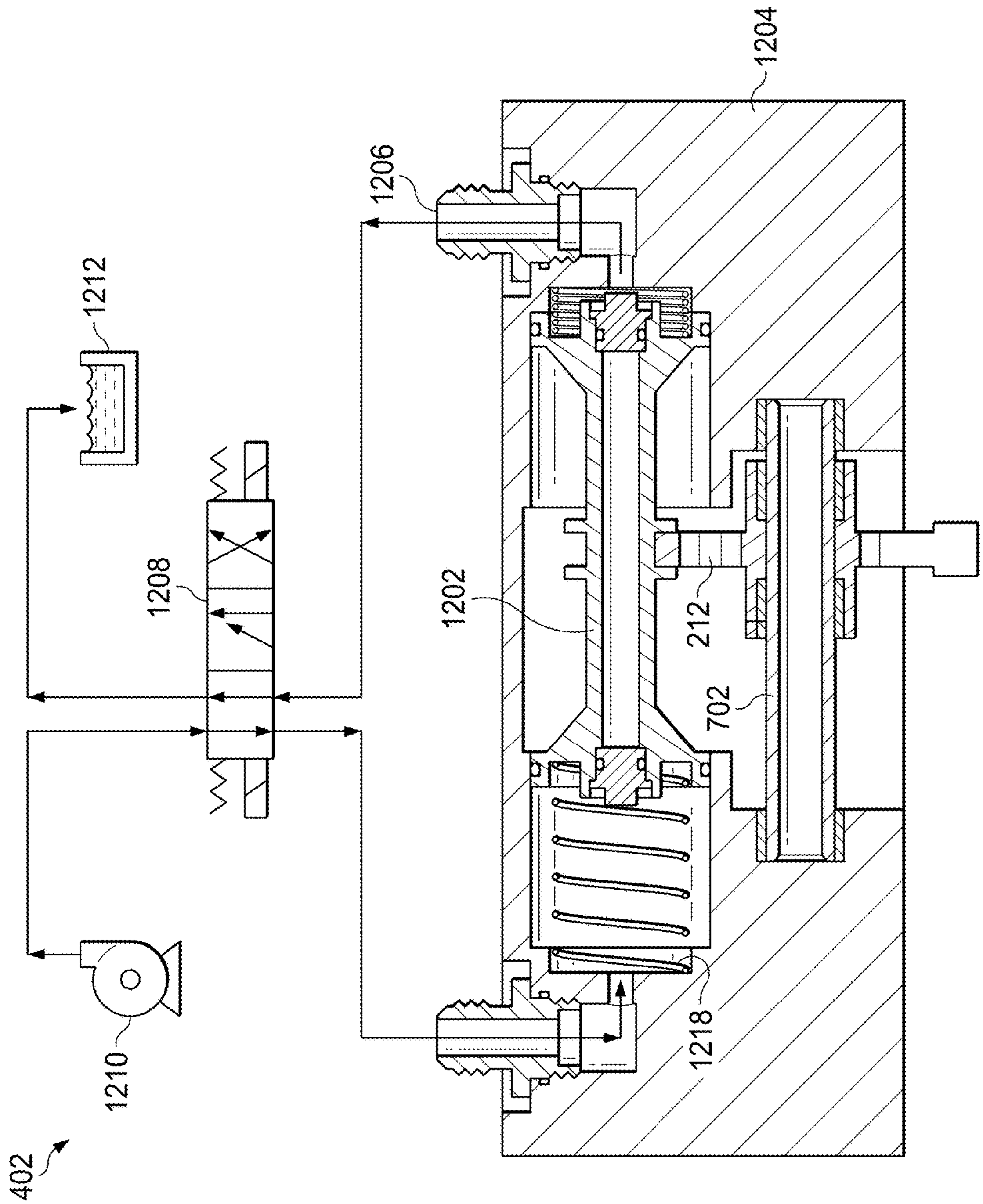

FIGS. 12A through 12C illustrate a first example position controller 402 for a clutch 210 and a selective actuator 212 in accordance with this disclosure. As shown in FIG. 12A, the position controller 402 takes the form of a dual-acting hydraulic system that can move a control piston 1202 back and forth within a support structure 1204. The control piston 1202 is coupled to the selective actuator 212, so movement of the control piston 1202 causes corresponding movement of the selective actuator 212 and therefore cause corresponding movement of the clutch 210 mechanically coupled to the selective actuator 212. The support structure 1204 here defines an interior cavity in which the control piston 1202 can move, and two fluid ports 1206 can be used to permit fluid to move into and out of the interior cavity of the support structure 1204 to adjust the position of the control piston 1202.

In this example, movement of the fluid into and out of the interior cavity of the support structure 1204 is controlled using at least one valve 1208, which is fluidly coupled to a pump 1210 and a tank 1212. The pump 1210 can be used to selectively provide fluid through the valve 1208 into the interior cavity of the support structure 1204 to move the control piston 1202 left or right within the support structure 1204. The valve 1208 can be used to control which direction the control piston 1202 moves based on fluid from the pump 1210. The tank 1212 can be used to temporarily hold fluid pushed out of the interior cavity of the support structure 1204 when the pump 1210 provides pressurized fluid to move the control piston 1202.

In FIG. 12A, the control piston 1202 is shown as having a neutral position, and the selective actuator 212 has a position that prevents the clutch 210 from engaging either gear shaft 204 or 206 of the gas turbine engine 100. The valve 1208 is controlled in this state to block the fluid pathway between the pump 1210 and the interior cavity of the support structure 1204. Instead, the valve 1208 fluidly couples both ends of the interior cavity of the support structure 1204 to the tank 1212. This can help to equalize the pressure on opposite sides of the control piston 1202, which can help to avoid biasing or movement of the control piston 1202.

In FIG. 12B, the control position 1202 is shown as having an engaged position, where the control position 1202 has been moved to the left. This moves the selective actuator 212 into a position that allows the clutch 210 to engage with one of the gear shafts 204 or 206 of the gas turbine engine 100. The valve 1208 is controlled in this state to fluidly couple the right end of the interior cavity of the support structure 1204 to the pump 1210 and to fluidly couple the left end of the interior cavity of the support structure 1204 to the tank 1212. This allows the pump 1210 to provide pressurized fluid that pushes the control position 1202 to the left.

In FIG. 12C, the control position 1202 is shown as having another engaged position, where the control position 1202 has been moved to the right. This moves the selective actuator 212 into a position that allows the clutch 210 to engage with another one of the gear shafts 204 or 206 of the gas turbine engine 100. The valve 1208 is controlled in this state to fluidly couple the left end of the interior cavity of the support structure 1204 to the pump 1210 and to fluidly couple the right end of the interior cavity of the support structure 1204 to the tank 1212. This allows the pump 1210 to provide pressurized fluid that pushes the control position 1202 to the right.

The valve 1208 in this example can be controlled using one or more actuators 1214, which can be used to translate, rotate, or otherwise move at least one portion of the valve 1208 to the change the setting of the valve 1208. The one or more actuators 1214 may, for example, represent one or more biasing solenoids or servos. The valve 1208 can also be used in conjunction with one or more springs 1216, which can be used to center or otherwise position the valve 1208 at a desired setting. In this example, the one or more springs 1216 may center the valve 1208, although the valve 1208 could be positioned in any other suitable position using the spring(s) 1216. Similarly, the control piston 1202 can be used in conjunction with one or more springs 1218, which can be used to center or otherwise position the control piston 1202 in a desired position. In this example, the one or more springs 1218 may center the control piston 1202, although the control piston 1202 could be positioned in any other suitable position using the spring(s) 1218.

One issue that can affect a hydraulic-based spool-selectable transmission 120 used with a gas turbine engine 100 is the loss or lack of hydraulic power from the gas turbine engine 100 (such as during engine startup), which can negatively impact or even prevent operation of the spool-selectable transmission 120. For example, if hydraulic actuation is used by a position controller 402 and a pump (such as the pump 1210) is driven by the gas turbine engine 100, there may be no oil or other fluid pressure to operate the position controller 402 at zero speed. However, in some cases, the spool-selectable transmission 120 may need to engage the electric machine 118 to a spool of the gas turbine engine 100 for engine starting functionality. The following describes example embodiments supporting various assistance techniques, which can be used to help engage the clutch 210 with the one of the spools of the gas turbine engine 100 during engine startup or at other suitable times. More specifically, these example embodiments use actuators (such as linear or servo valve-actuated actuators) that can be used to control the position of the control piston 1202 to place the control piston 1202 into one of its engaged positions.

Figure 13A:
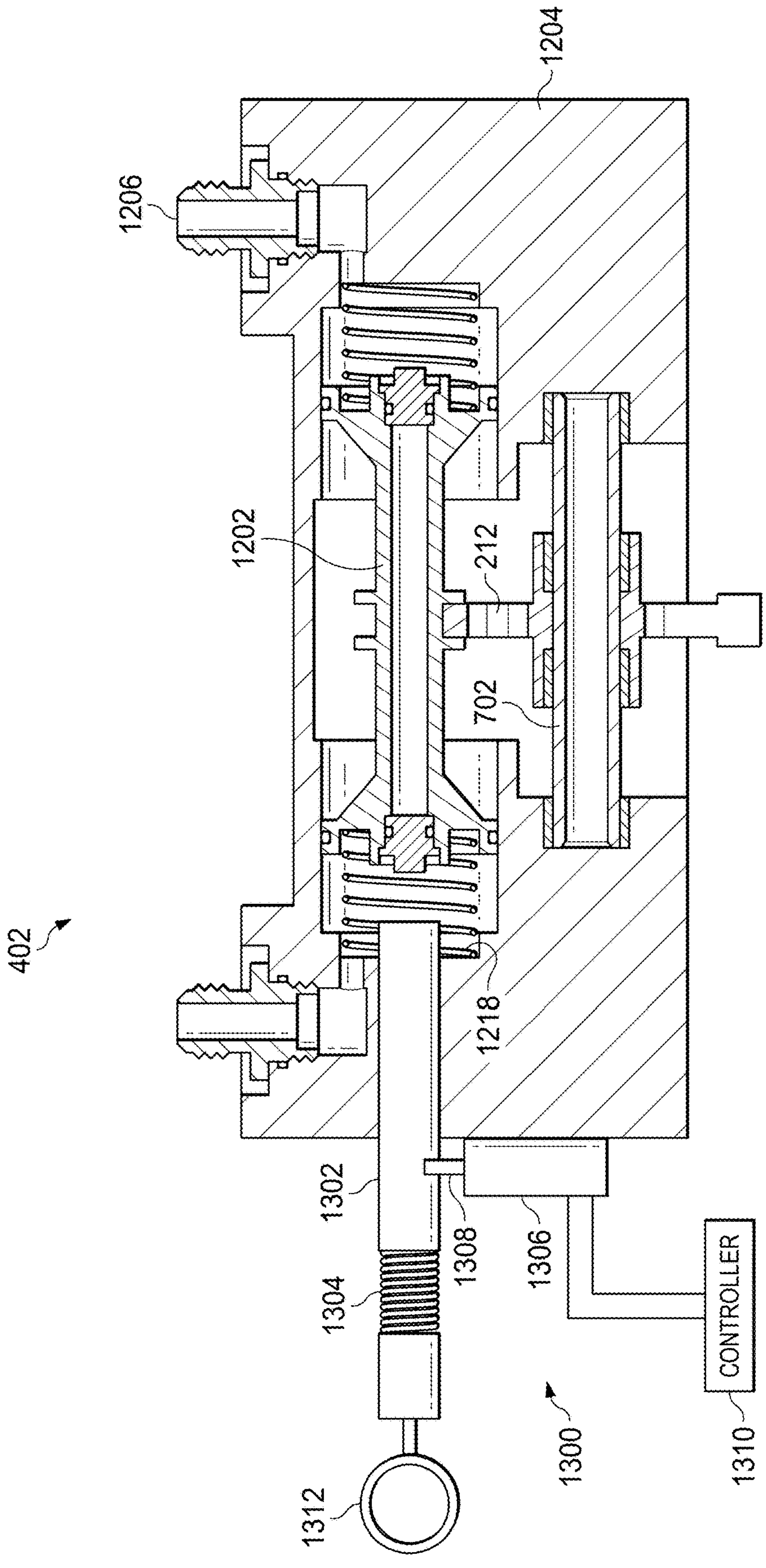
FIGS. 13A and 13B illustrate a second example position controller for a clutch and a selective actuator in accordance with this disclosure.
Figure 13B:
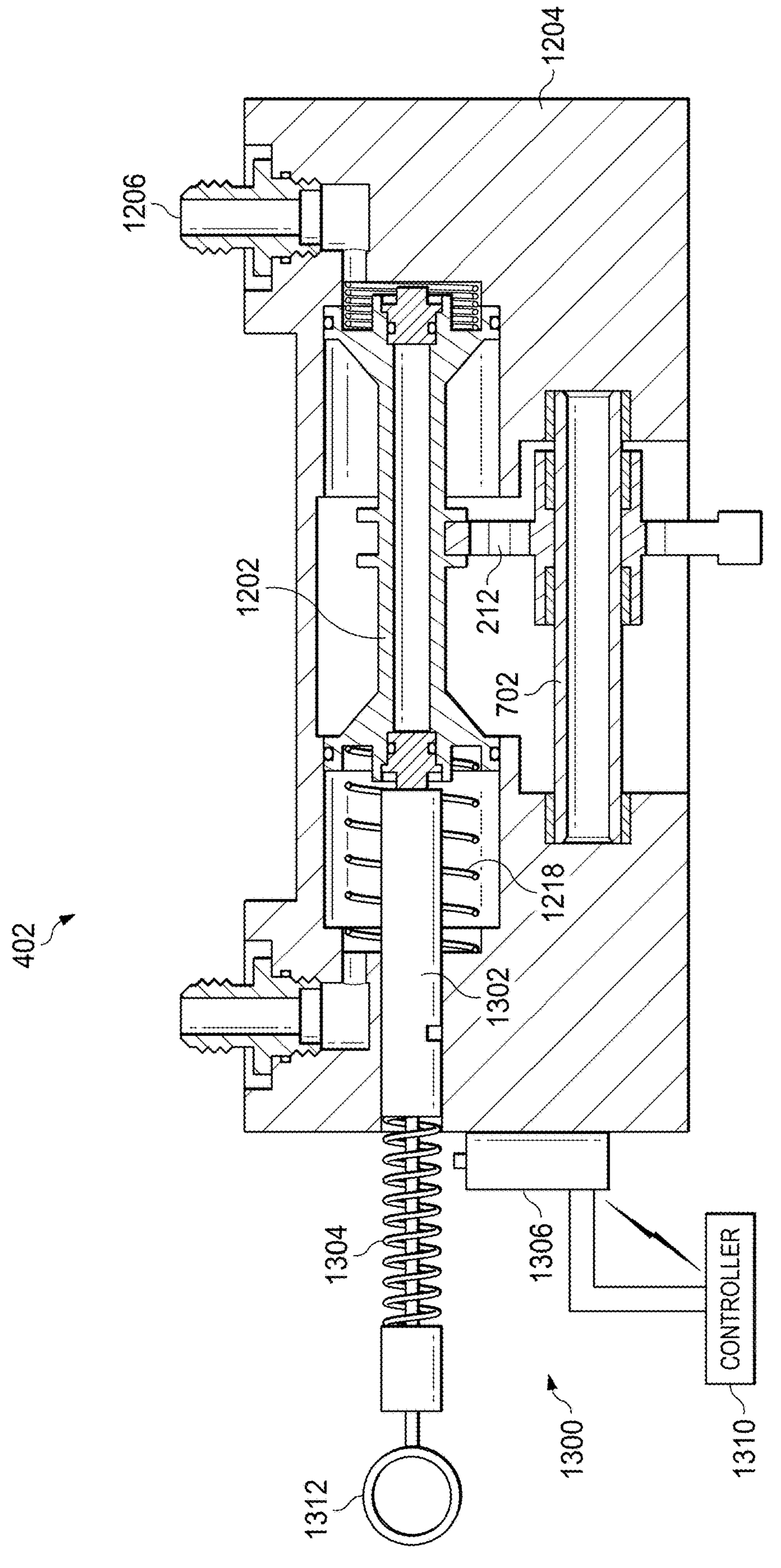

FIGS. 13A and 13B illustrate a second example position controller 402 for a clutch 210 and a selective actuator 212 in accordance with this disclosure. As shown in FIGS. 13A and 13B, the position controller 402 is similar to the position controller 402 in FIGS. 12A through 12C. However, in this example, the position controller 402 includes an assist mechanism in the form of a linear actuator 1300, which can be used to move the control piston 1202 into a desired position (to the right engaged position in this example). In some embodiments, the desired position can represent the position where the selective actuator 212 moves the clutch 210 into engagement with a desired gear shaft 204 or 206. As a particular example, the desired position can represent the position where the selective actuator 212 moves the clutch 210 into engagement with the gear shaft 206 so that the clutch 210 engages with the HP spool of the gas turbine engine 100.

In this example, the linear actuator 1300 includes a plunger 1302 and at least one actuation spring 1304. The plunger 1302 can remain spaced apart from the control piston 1202 when the spring 1304 is in a compressed state as shown in FIG. 13A. When the spring 1304 is released, the spring 1304 can expand to push the plunger 1302 into the control piston 1202, forcing the control piston 1202 to move right as shown in FIG. 13B. In the illustrated embodiment, the spring 1304 can remain in the compressed state under the control of a solenoid 1306. The solenoid 1306 can control the position of a retract rod 1308, where the retract rod 1308 can extend into a detent within the plunger 1302.

When the retract rod 1308 extends into the plunger 1302 as shown in FIG. 13A, the plunger 1302 can be locked in place, and the spring 1304 can be maintained in the compressed state. During this time, the control piston 1202 may remain in the neutral position or be driven into one of multiple engaged positions as described above. When the retract rod 1308 is removed from the plunger 1302 as shown in FIG. 13B, the spring 1304 can expand, causing the plunger 1302 to move the control piston 1202. This allows the control piston 1202 to force the selective actuator 212 to move the clutch 210 into one of its engaged positions (such as during engine startup). The solenoid 1306 can be coupled to a controller 1310 that controls the operation of the solenoid 1306, such as by providing one or more control and/or electrical signals to control or energize the solenoid 1306. In some cases, the force applied by the linear actuator 1300 to the control piston 1202 may be adequate to keep the control piston 1202 in this engaged position, but pressure from the pump 1210 may be used to overcome the spring force provided by the spring 1304 in order to move the control piston 1202 to the left (into the neutral position or the opposite engaged position).

In this way, the linear actuator 1300 can be used to force the control piston 1202 into a desired position, which can also force the clutch 210 to engage a desired spool of the gas turbine engine 100. This may be useful or desirable in various circumstances, such as when the clutch 210 should engage the HP spool of the gas turbine engine 100 when there is a lack of power to operate the pump 1210. The linear actuator 1300 may be returned from the state shown in FIG. 13B to the state shown in FIG. 13A, such as by pulling on a reset ring 1312 or other projection from the linear actuator 1300 and re-extending the retract rod 1308 into the plunger 1302. Force may be applied to the reset ring 1312 in any suitable manner, such as manually or via a motor or other electronic mechanism. When the solenoid 1306 loses power or otherwise allows the retract rod 1308 to extend, the retract rod 1308 can enter the plunger 1302 and lock it in place again. At that point, assuming the gas turbine engine 100 is operating, the control piston 1202 can be moved via hydraulic pressure from the pump 1210.

Figure 14A:
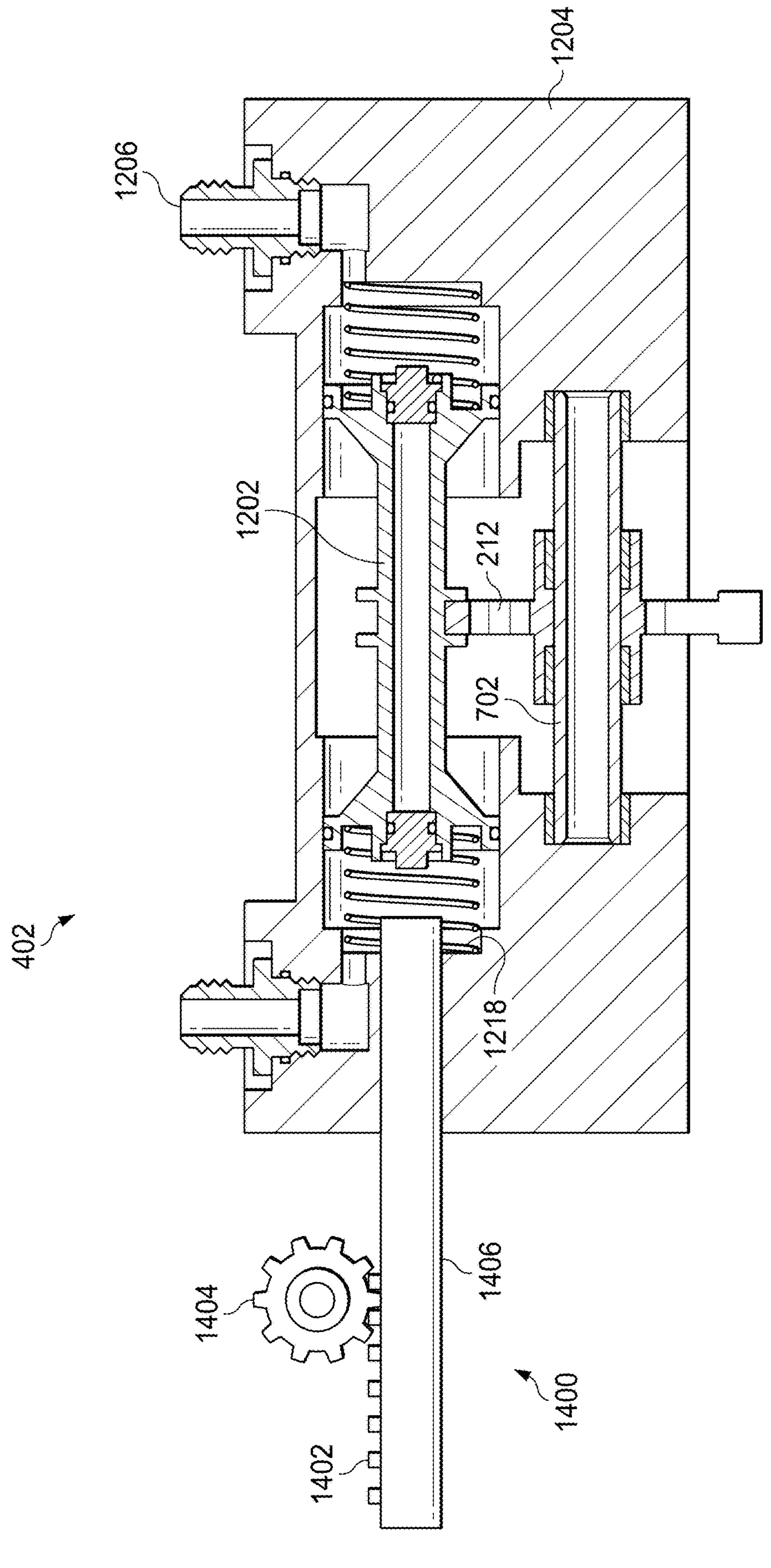
FIGS. 14A and 14B illustrate a third example position controller for a clutch and a selective actuator in accordance with this disclosure.
Figure 14B:
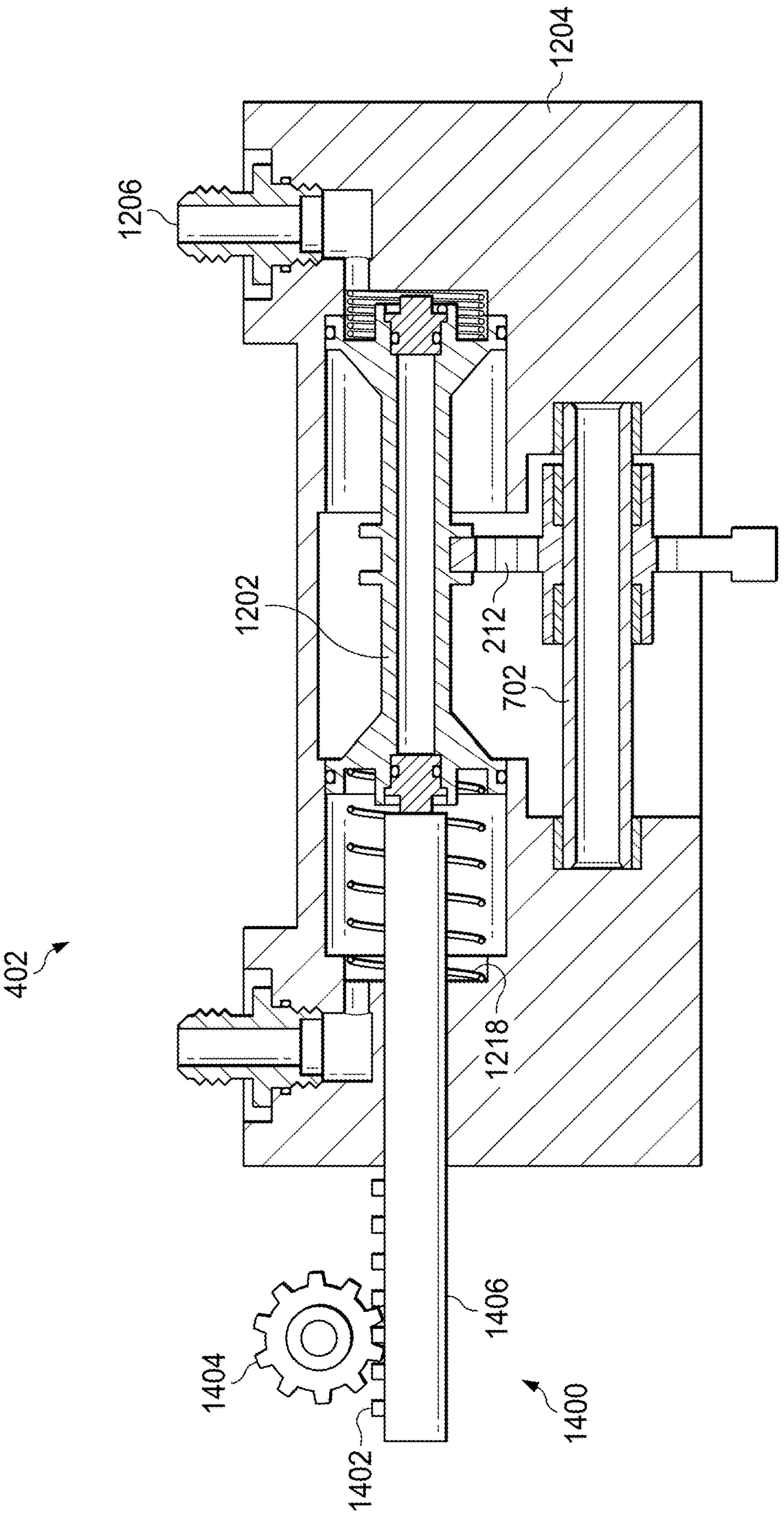

FIGS. 14A and 14B illustrate a third example position controller 402 for a clutch 210 and a selective actuator 212 in accordance with this disclosure. As shown in FIGS. 14A and 14B, the position controller 402 is similar to the position controller 402 in FIGS. 13A and 13B. However, in this example, the position controller 402 includes an assist mechanism in the form of a linear actuator 1400 having a rack 1402 and a pinion 1404, where the rack 1402 is coupled to or formed integral with a push rod 1406. The pinion 1404 can rotate and include teeth or other structures that interact with corresponding teeth or other structures of the rack 1402. Since the pinion 1404 can be fixed in place, rotation of the pinion 1404 clockwise moves the rack 1402 to the left, and rotation of the pinion 1404 counter-clockwise moves the rack 1402 to the right.

As shown in FIG. 14A, before the rack 1402 is moved, the push rod 1406 can remain spaced apart from the control piston 1202. As shown in FIG. 14B, when the pinion is rotated counter-clockwise, the rack 1402 moves to the right and pushes the push rod 1406 into the control piston 1202, forcing the control piston 1202 into a desired position (to the right engaged position in this example). In some embodiments, the desired position can represent the position where the selective actuator 212 moves the clutch 210 into engagement with a desired gear shaft 204 or 206. As a particular example, the desired position can represent the position where the selective actuator 212 moves the clutch 210 into engagement with the gear shaft 206 so that the clutch 210 engages with the HP spool of the gas turbine engine 100.

Before the rack 1402 is moved into the control piston 1202 as shown in FIG. 14A, the push rod 1406 is spaced apart from the control piston 1202. During this time, the control piston 1202 may remain in the neutral position or be driven into one of multiple engaged positions as described above. When the rack 1402 is moved to the right as shown in FIG. 14B, the push rod 1406 moves the control piston 1202. This allows the control piston 1202 to force the selective actuator 212 to move the clutch 210 into one of its engaged positions (such as during engine startup). In this way, the linear actuator 1400 can be used to force the control piston 1202 into a desired position, which can also force the clutch 210 to engage a desired spool of the gas turbine engine 100. Again, this may be useful or desirable in various circumstances, such as when the clutch 210 should engage the HP spool of the gas turbine engine 100 when there is a lack of power to operate the pump 1210. The linear actuator 1400 may be returned from the state shown in FIG. 14B to the state shown in FIG. 14A, such as by rotating the pinion 1404 clockwise. At that point, assuming the gas turbine engine 100 is operating, the control piston 1202 can be moved via hydraulic pressure from the pump 1210.

Note that while a spring-loaded plunger and a rack and pinion are two possible designs for a linear actuator used as an assist mechanism in a position controller 402, these are examples only. Any other suitable linear actuators may be used as an assist mechanism in a position controller 402 to force the control piston 1202 into a desired position.

Figure 15A:
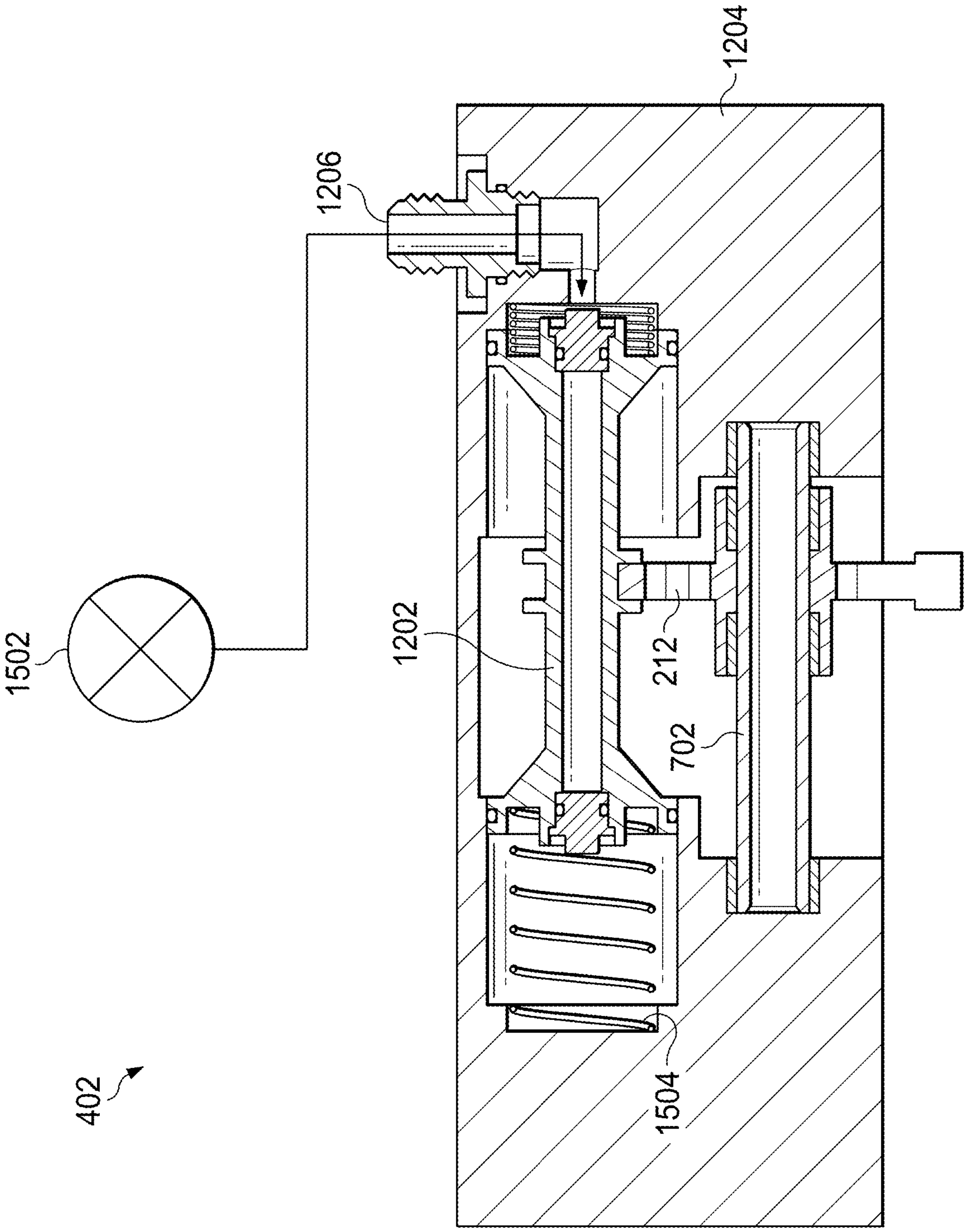
FIGS. 15A through 15C illustrate a fourth example position controller for a clutch and a selective actuator in accordance with this disclosure.
Figure 15B:
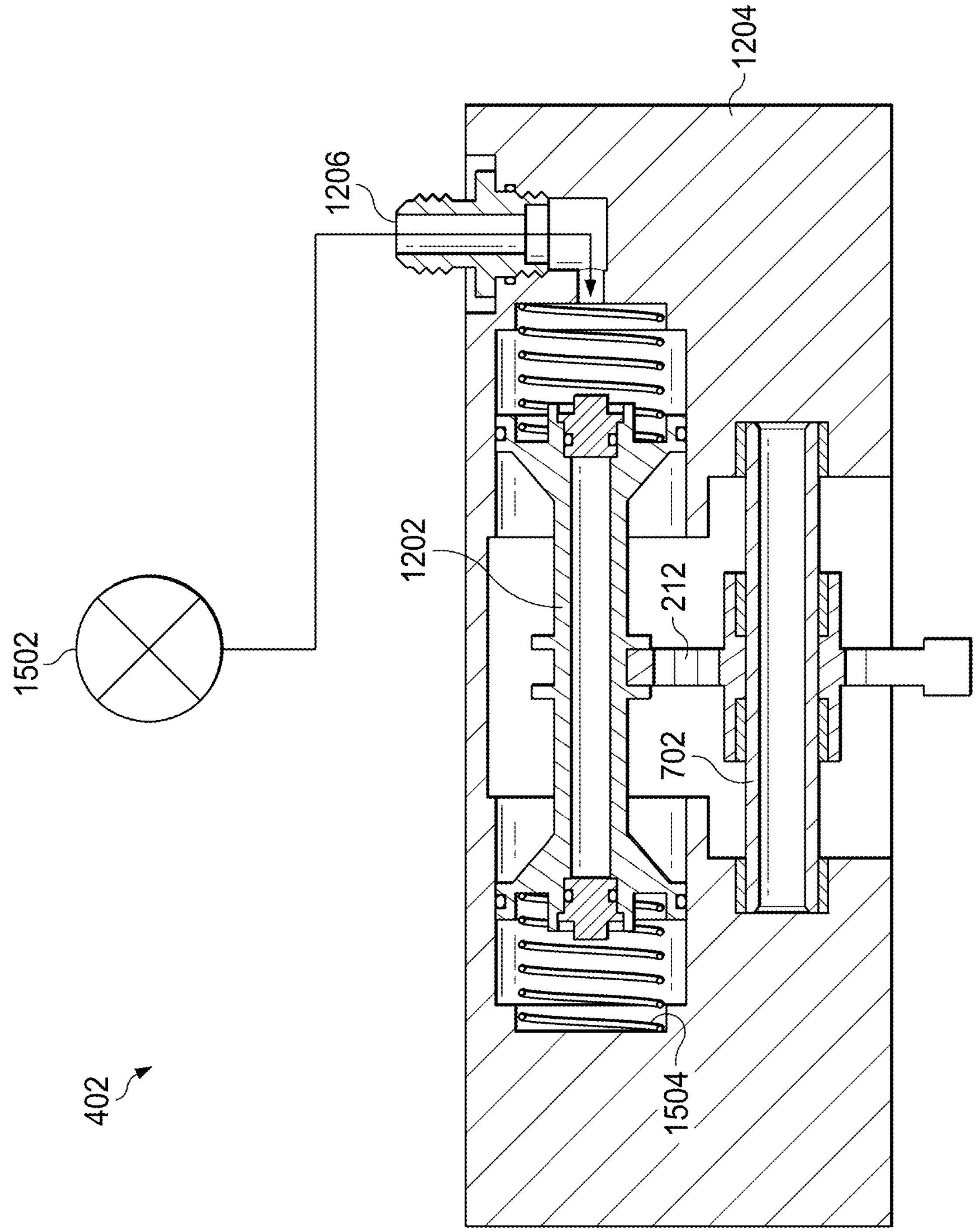
Figure 15C:
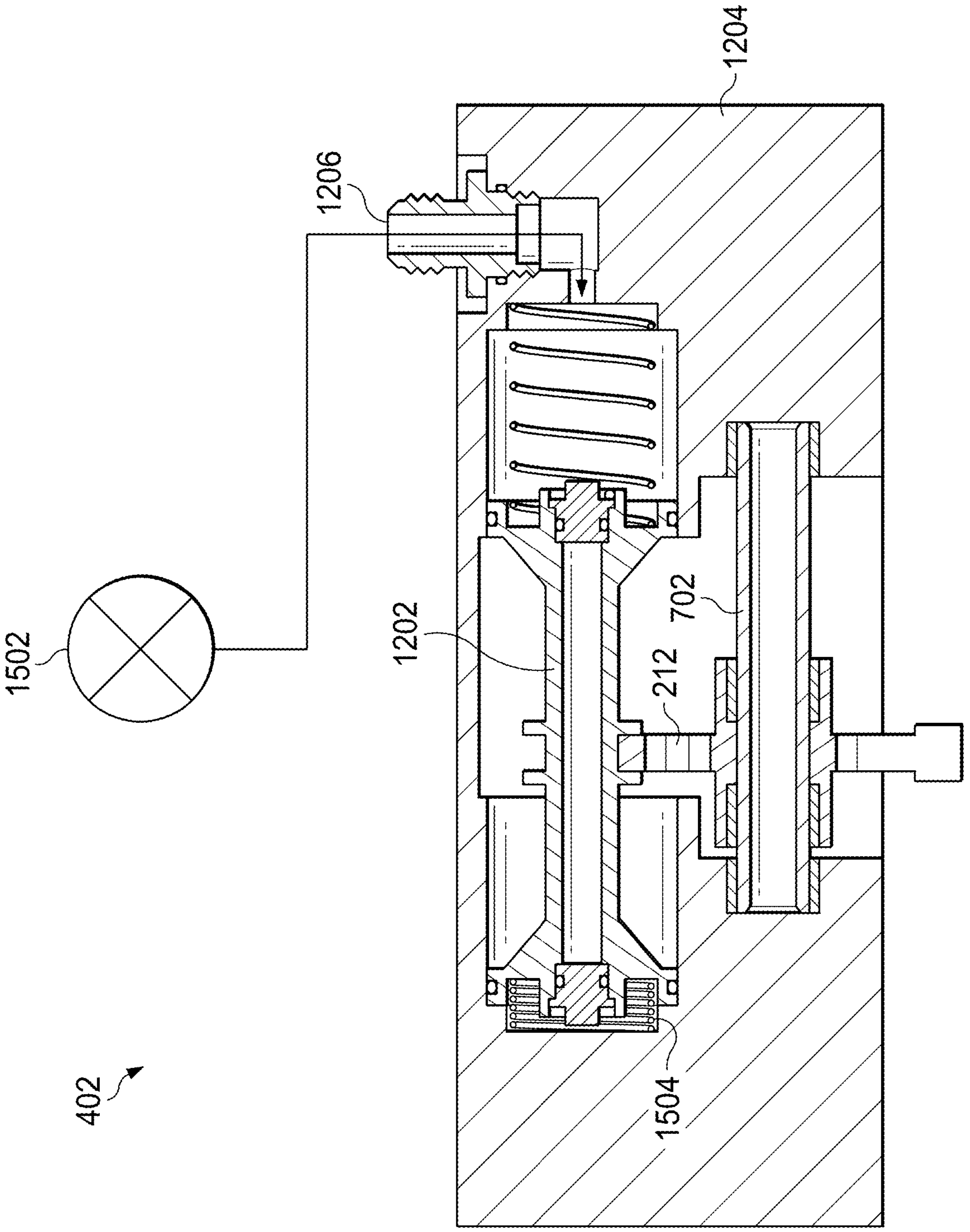

FIGS. 15A through 15C illustrate a fourth example position controller 402 for a clutch 210 and a selective actuator 212 in accordance with this disclosure. As shown in FIGS. 15A through 15C, the position controller 402 here includes various components that are the same as or similar to various components described above, such as the control piston 1202, support structure 1204, and fluid ports 1206. In addition, the position controller 402 includes a servo valve-actuated actuator 1502, which can be used to selectively apply fluid pressure to the control piston 1202 in order to move the control piston 1202.

As shown in FIG. 15A, the control piston 1202 is biased in one position using at least one spring 1504. In this particular example, the spring 1504 biases the control piston 1202 to the right so that the clutch 210 is in one of its engaged positions, which in some cases may represent the position where the clutch 210 engages with the gear shaft 206 to drive or be driven by the HP spool of the gas turbine engine 100. As noted earlier, this may be done during engine startup or at other suitable times.

As shown in FIG. 15B, when the servo valve-actuated actuator 1502 is partially activated, a lesser amount of fluid pressure pushes the control piston 1202 to the left so that the clutch 210 is in a neutral position. As shown in FIG. 15C, when the servo valve-actuated actuator 1502 is fully activated, a greater amount of fluid pressure pushes the control piston 1202 to the left further so that the clutch 210 is in another one of its engaged positions, which in some cases may represent the position where the clutch 210 engages with the gear shaft 204 to drive or be driven by the LP spool of the gas turbine engine 100. Note that after engine startup or at other times, the servo valve-actuated actuator 1502 may provide no fluid pressure, and pressure from the pump 1210 may be used to control the position of the control piston 1202.

As can be seen here, the control piston 1202 may bias the clutch 210 into one of its engaged positions using the spring 1504, which can be done to support engine startup or other functions. However, there may be some situations in which it is not desirable to keep the control piston 1202 in this engaged position after engine startup, such as when there is a problem with the gas turbine engine 100 or a problem that prevents the pump 1210 or other components from moving the control piston 1202. In these cases, a failsafe may be provided to force the control piston 1202 into a desired position, such as a position in which the clutch 210 has a neutral position.

Figure 16A:
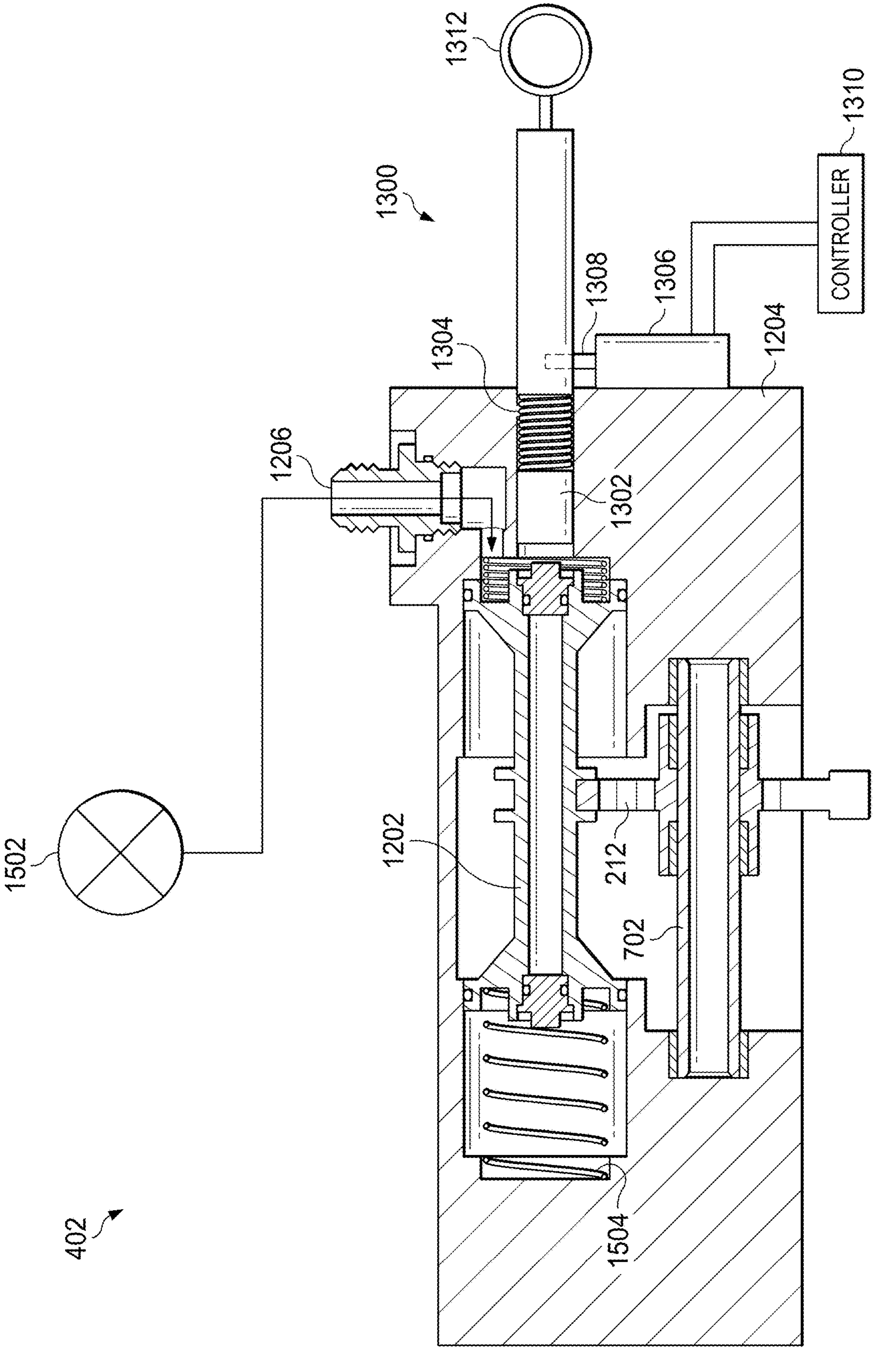
FIGS. 16A and 16B illustrate a fifth example position controller for a clutch and a selective actuator in accordance with this disclosure.
Figure 16B:
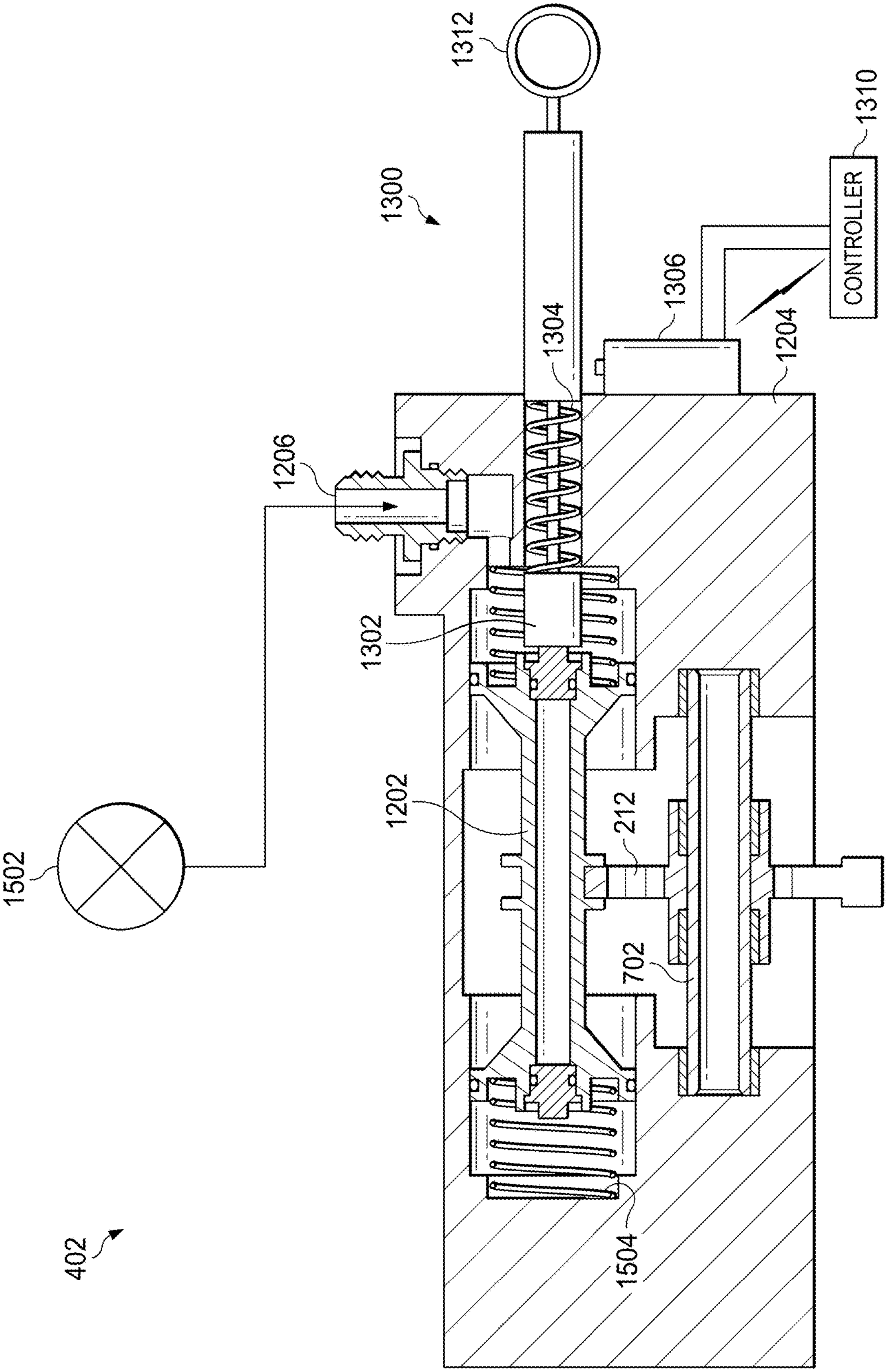

FIGS. 16A and 16B illustrate a fifth example position controller 402 for a clutch 210 and a selective actuator 212 in accordance with this disclosure. As shown in FIGS. 16A and 16B, the position controller 402 is similar to the position controller 402 in FIGS. 15A through 15C. However, in this example, the position controller 402 incorporates a failsafe in the form of a linear actuator 1300, which may have the same or similar form as described above with reference to FIGS. 13A and 13B.

As shown in FIG. 16A, prior to activation of the linear actuator 1300, the control piston 1202 may be biased to the right using the spring 1504. As shown in FIG. 16B, after activation of the linear actuator 1300, the control piston 1202 is pushed to the left so that the clutch 210 can be in a different position, such as its neutral position. Here, the linear actuator 1300 can overcome the biasing spring force applied by the spring 1504 and move the control piston 1202 so that the clutch 210 obtains the desired position. If and when normal operation of the gas turbine engine 100 or the pump 1210 is restored, the linear actuator 1300 may be reset as described above.

Note that the use of the linear actuator 1300 as a failsafe here is for illustration only. Any other suitable linear actuators (such as the linear actuator 1400) may be used as the failsafe. Also note that other types of actuators may be used as a failsafe here to move the control piston 1202 into a desired position, such as a position where the clutch 210 is in its neutral position and not engaged with any spool of the gas turbine engine 100.

Note that a hydraulic-based system is described above as being used by various position controllers 402 to move selective actuators 212 into desired positions. However, non-hydraulic-based mechanisms may also be used in position controllers 402 in order to control the positions of clutches 210 in spool-selectable transmissions 120 or other systems.

Figure 17A:
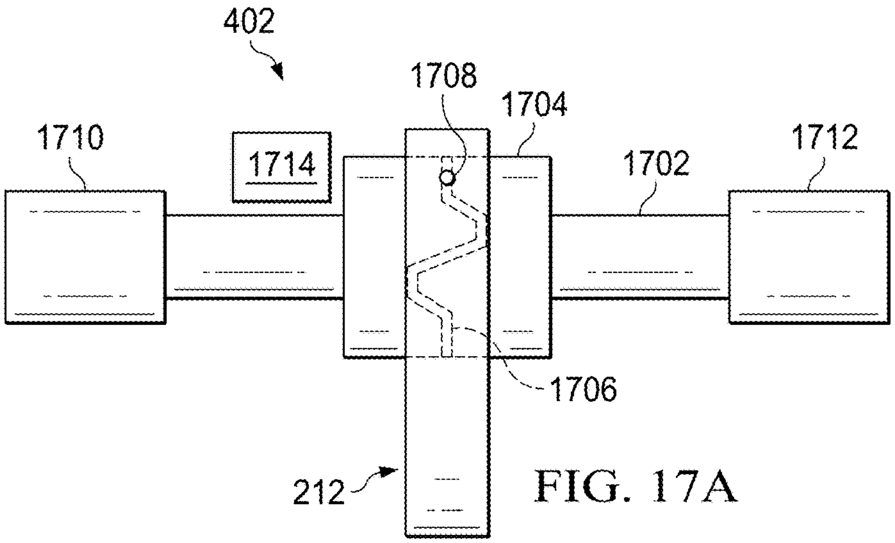
FIGS. 17A through 17C illustrate a sixth example position controller for a clutch and a selective actuator in accordance with this disclosure.
Figure 17B:
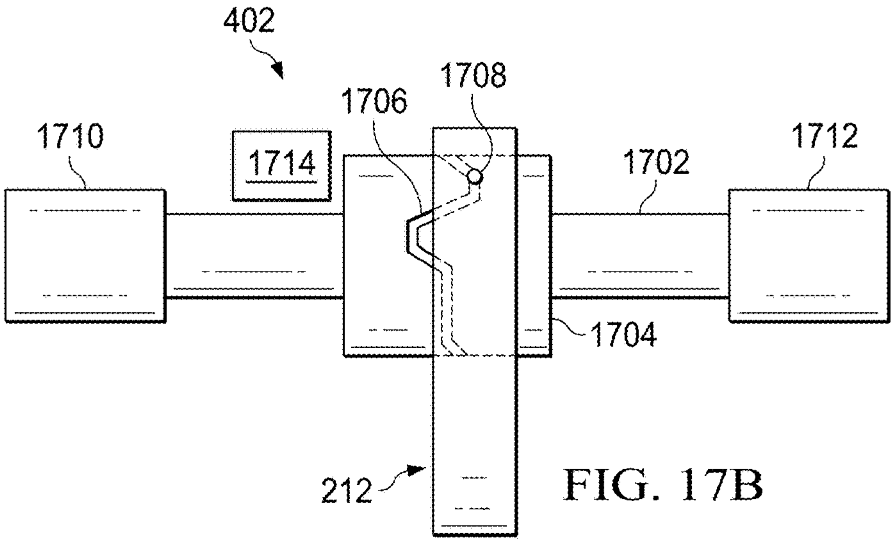
Figure 17C:
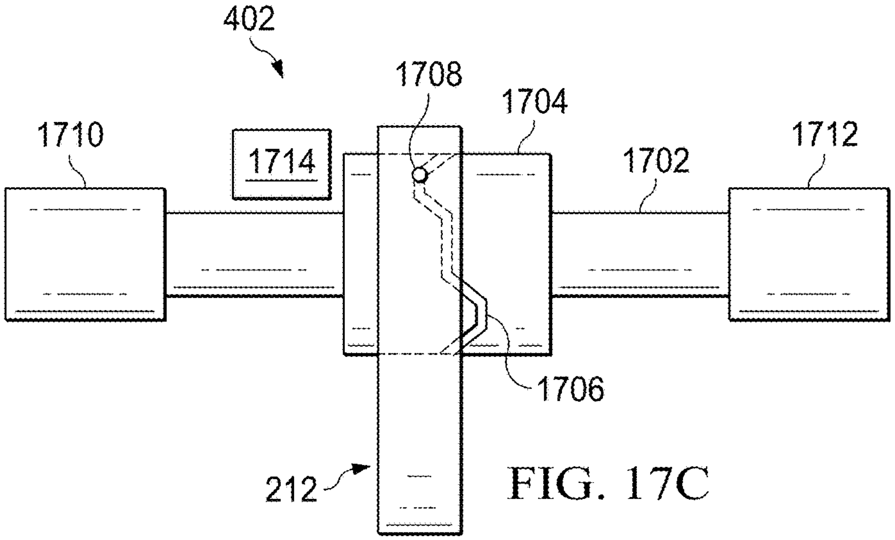

FIGS. 17A through 17C illustrate a sixth example position controller 402 for a clutch 210 and a selective actuator 212 in accordance with this disclosure. As shown in FIG. 17A, the position controller 402 includes a rotatable shaft 1702 attached to a shift barrel 1704. A portion of the selective actuator 212 is shown here and surrounds the shift barrel 1704. The shift barrel 1704 includes a track 1706, and a guide pin 1708 extends through the portion of the selective actuator 212 and into the track 1706.

The rotatable shaft 1702 can be fixed in place and can be rotated, such as by using a suitable actuator 1710 like an electric or hydraulic motor. Rotation of the shaft 1702 and shift barrel 1704 causes the guide pin 1708 to move along the track 1706, which also causes the selective actuator 212 to move left or right based on where the guide pin 1708 is located within the track 1706. For example, in FIG. 17A, the guide pin 1708 is located within a portion of the track 1706 that is more centered within the shift barrel 1704, which can cause the selective actuator 212 to move the clutch 210 into a neutral position. In FIG. 17B, the guide pin 1708 is located within a portion of the track 1706 that is more to the right within the shift barrel 1704, which can cause the selective actuator 212 to move the clutch 210 into a first engaged position (such as with the gear shaft 206). In FIG. 17C, the guide pin 1708 is located within a portion of the track 1706 that is more to the left within the shift barrel 1704, which can cause the selective actuator 212 to move the clutch 210 into a second engaged position (such as with the gear shaft 204).

As can be seen here, rotation of the shaft 1702 need not be constant, meaning the shaft 1702 can be rotated until the shift barrel 1704 is in a desired orientation (at which point rotation of the shaft 1702 can stop until the shift barrel 1704 needs to be moved again). If necessary, a failsafe 1712 may be provided to rotate the shaft 1702 until the clutch 210 is in a desired position in response to a failure of the actuator 1710 or other issue. In some cases, the failsafe 1712 may represent a separate motor or other actuator. In other cases, the failsafe 1712 may represent at least one torsion spring that biases the shaft 1702 in a certain rotational position.

Note that while the actuator 1710 and the failsafe 1712 are shown on opposite ends of the shaft 1702, the actuator 1710 and the failsafe 1712 may have any suitable position(s). In some embodiments, the actuator 1710 and optionally the failsafe 1712 may be positioned so as to be easily removed from the spool-selectable transmission 120 or other transmission system and replaced without removal of the entire transmission system. For instance, the actuator 1710 and optionally the failsafe 1712 may be externally mounted on the transmission system. Also, in some embodiments, at least one position sensor 1714 may be used to identify the rotational position of the shaft 1702 or shift barrel 1704 or to otherwise help identify the current position of the selective actuator 212. This can help in the sensing and verification of whether the clutch 210 has been moved into a suitable position, such as a neutral or engaged position. In addition, in some embodiments, the actuator 1710 may include or be used in conjunction with step-up or step-down gearing to increase or decrease the speed at which the shaft 1702 rotates, thereby increasing or decreasing the speed at which the clutch 210 is moved.

Figure 18A:
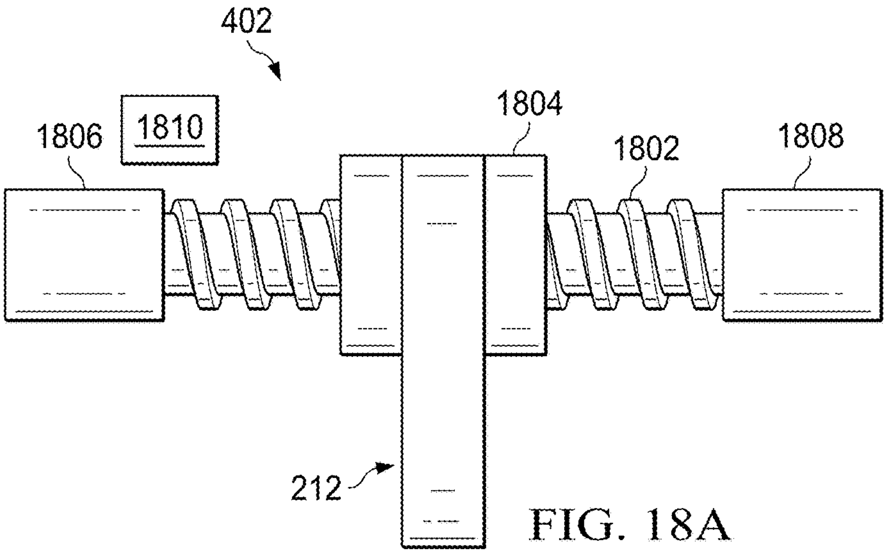
FIGS. 18A through 18C illustrate a seventh example position controller for a clutch and a selective actuator in accordance with this disclosure.
Figure 18B:
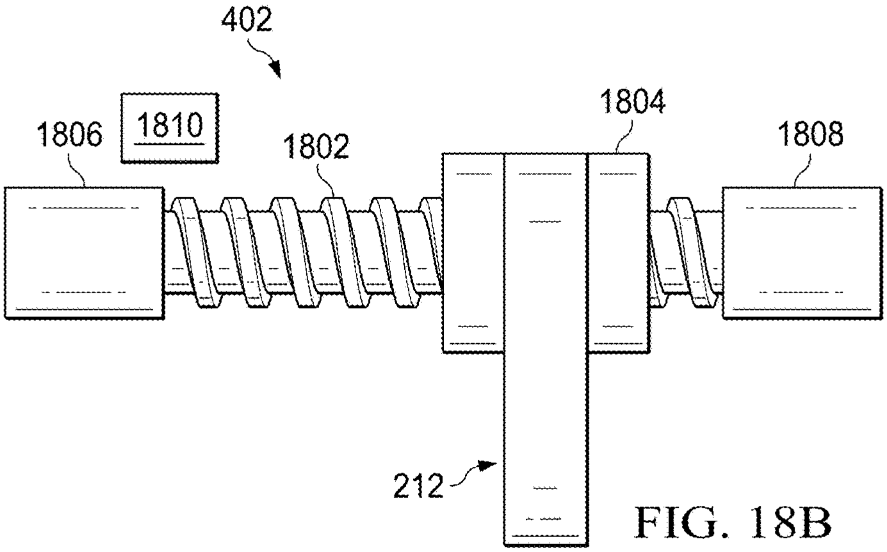
Figure 18C:
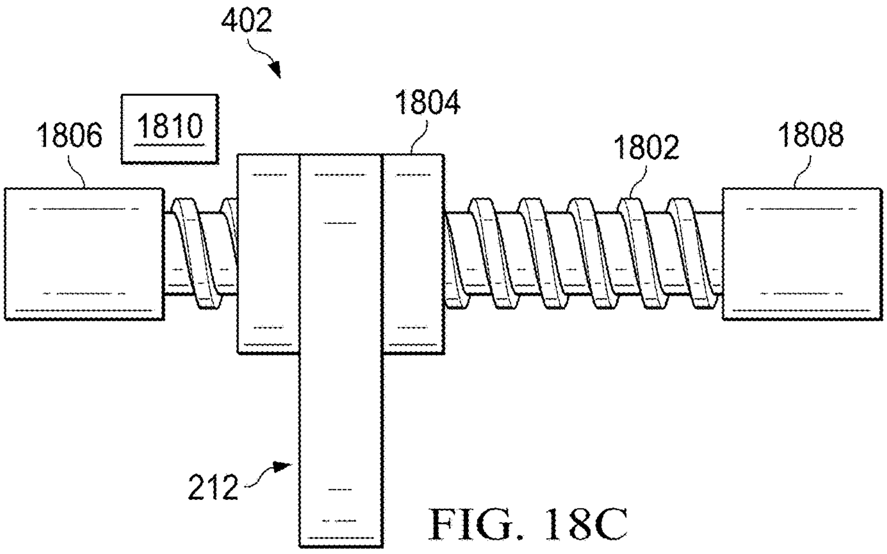

FIGS. 18A through 18C illustrate a seventh example position controller 402 for a clutch 210 and a selective actuator 212 in accordance with this disclosure. As shown in FIG. 18A, the position controller 402 includes a threaded rotatable shaft 1802 coupled to, integral with, or otherwise associated with a mount 1804. In some cases, the shaft 1802 and the mount 1804 may represent a ball screw. A portion of the selective actuator 212 is shown here and is attached to the mount 1804. In some embodiments, the selective actuator 212 may be threaded onto the mount 1804 or threaded directly onto the shaft 1802.

The rotatable shaft 1802 can be fixed in place and can be rotated, such as by using a suitable actuator 1806 like an electric or hydraulic motor. Rotation of the shaft 1802 causes the mount 1804 to move left or right, which also causes the selective actuator 212 to move left or right based on the direction of rotation of the shaft 1802. For example, in FIG. 18A, the mount 1804 is more centered, which can cause the selective actuator 212 to move the clutch 210 into a neutral position. In FIG. 18B, the mount 1804 is positioned more to the right, which can cause the selective actuator 212 to move the clutch 210 into a first engaged position (such as with the gear shaft 206). In FIG. 18C, the mount 1804 is positioned more to the left, which can cause the selective actuator 212 to move the clutch 210 into a second engaged position (such as with the gear shaft 204).

As can be seen here, rotation of the shaft 1802 need not be constant, meaning the shaft 1802 can be rotated until the mount 1804 is in a desired position (at which point rotation of the shaft 1802 can stop until the mount 1804 needs to be moved again). If necessary, a failsafe 1808 may be provided to rotate the shaft 1802 until the clutch 210 is in a desired position in response to a failure of the actuator 1806 or other issue. In some cases, the failsafe 1808 may represent a separate motor or other actuator.

Note that while the actuator 1806 and the failsafe 1808 are shown on opposite ends of the shaft 1802, the actuator 1806 and the failsafe 1808 may have any suitable position(s). In some embodiments, the actuator 1806 and optionally the failsafe 1808 may be positioned so as to be easily removed from the spool-selectable transmission 120 or other transmission system and replaced without removal of the entire transmission system. For instance, the actuator 1806 and optionally the failsafe 1808 may be externally mounted on the transmission system. Also, in some embodiments, at least one resolver, encoder, or other sensor 1810 may be used to identify the rotational position of the shaft 1802 or mount 1804 or to otherwise help identify the current position of the selective actuator 212. This can help in the sensing and verification of whether the clutch 210 has been moved into a suitable position, such as a neutral or engaged position. In addition, in some embodiments, the actuator 1806 may include or be used in conjunction with step-up or step-down gearing to increase or decrease the speed at which the shaft 1802 rotates, thereby increasing or decreasing the speed at which the clutch 210 is moved.

Figure 19A:
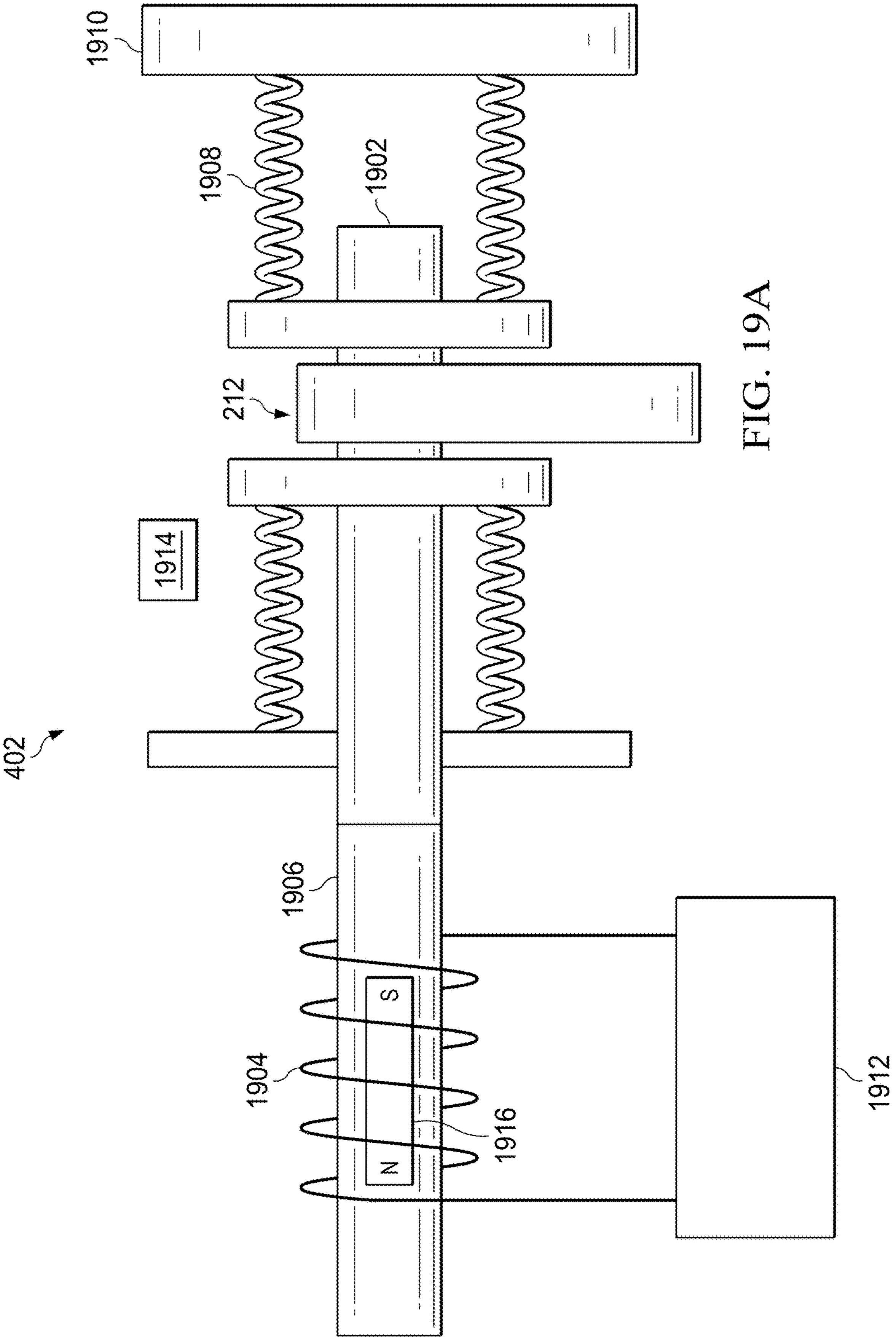
FIGS. 19A through 19C illustrate an eighth example position controller for a clutch and a selective actuator in accordance with this disclosure.
Figure 19B:
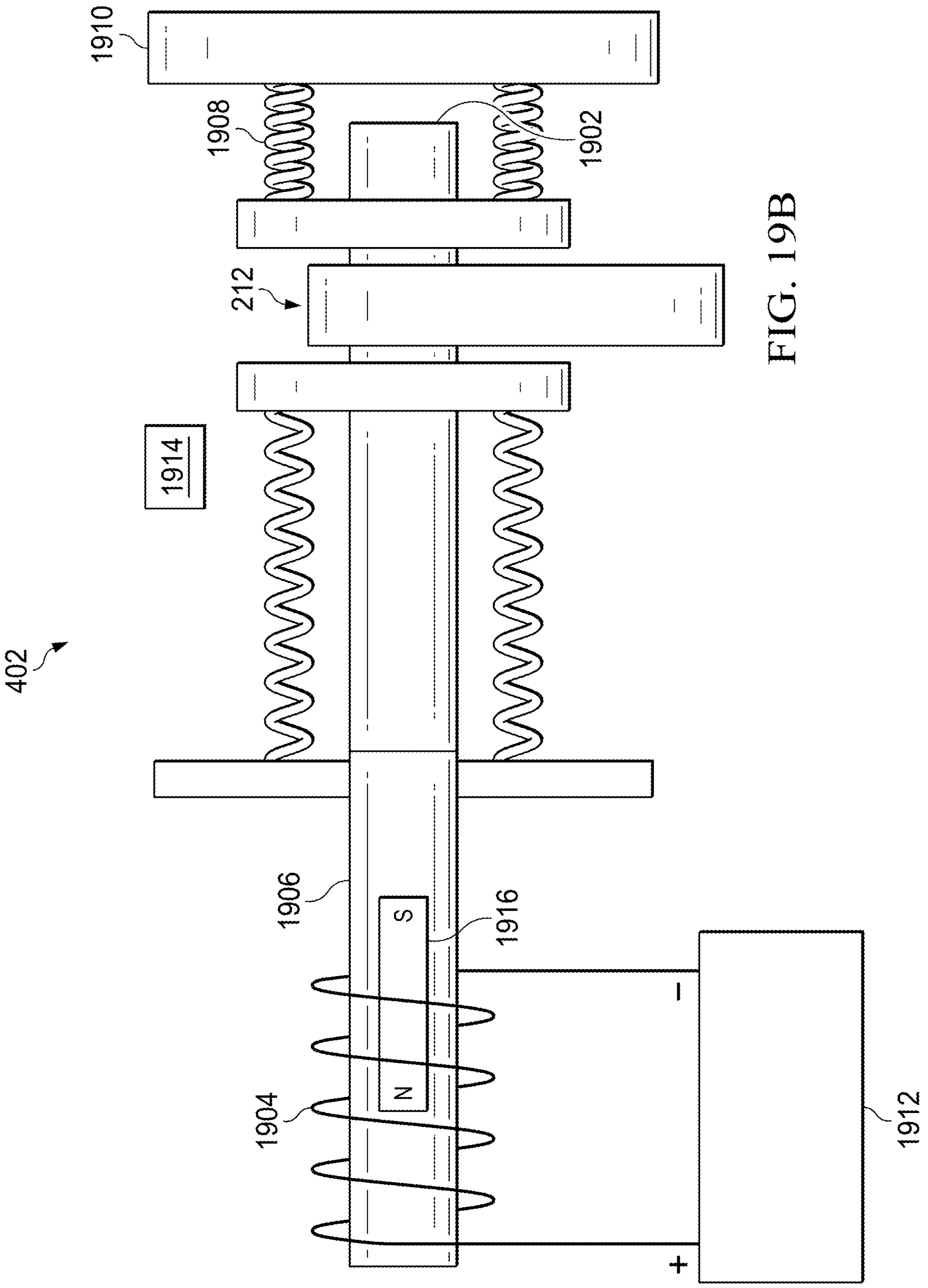
Figure 19C:
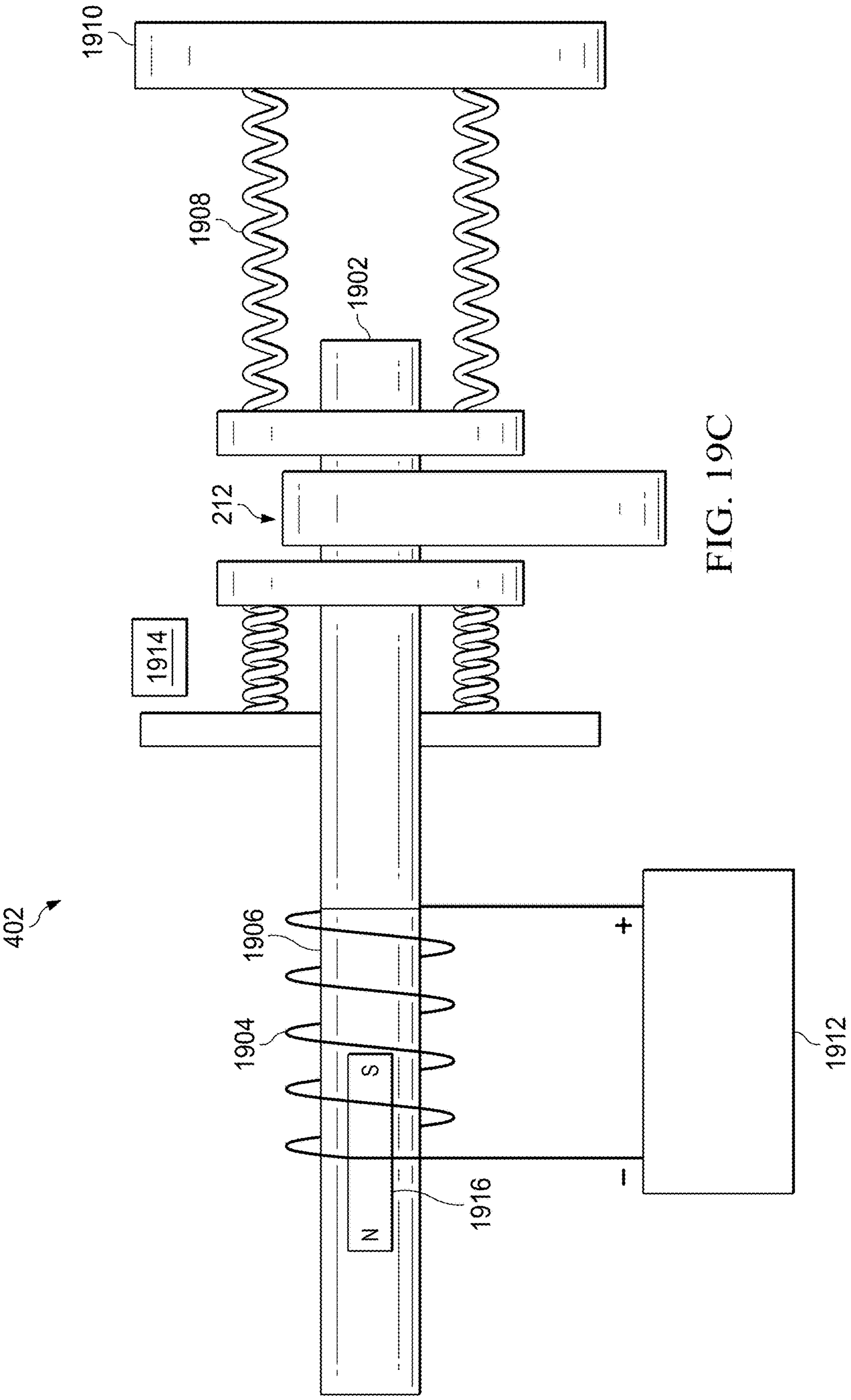

FIGS. 19A through 19C illustrate an eighth example position controller 402 for a clutch 210 and a selective actuator 212 in accordance with this disclosure. As shown in FIG. 19A, the position controller 402 includes a movable shaft 1902 and a solenoid 1904, which can be formed around an end of the shaft 1902 or around another shaft 1906 coupled to the shaft 1902. A portion of the selective actuator 212 is shown here and is attached to or otherwise associated with the shaft 1902. The movable shaft 1902 can be moved left or right depending on if and how the solenoid 1904 is energized, and springs 1908 can couple the movable shaft 1902 to one or more support structures 1910.

The solenoid 1904 can be energized by an actuator 1912, and the polarization of a voltage applied to the solenoid 1904 can be used to control the direction of movement of the shaft 1902 via interaction with a permanent magnet 1916. Movement of the shaft 1902 causes the selective actuator 212 to move left or right based on how the solenoid 1904 is energized. For example, in FIG. 19A, the solenoid 1904 is not energized, which can cause the selective actuator 212 to move the clutch 210 into a neutral position. In FIG. 19B, the solenoid 1904 is energized with a voltage of a first polarization, which can cause the selective actuator 212 to move the clutch 210 into a first engaged position (such as with the gear shaft 206). In FIG. 19C, the solenoid 1904 is energized with a voltage of an opposite second polarization, which can cause the selective actuator 212 to move the clutch 210 into a second engaged position (such as with the gear shaft 204).

As can be seen here, the springs 1908 can be used to return the shaft 1902 to a specified position, such as one in which the clutch 210 is in a neutral position. Here, a failsafe may not be needed due to the presence of the springs 1908. However, an assist mechanism (such as a linear actuator 1300 or 1400) might be provided to help move the shaft 1902 into a desired position at one or more suitable times (such as to engage the LP or HP spool during engine startup).

In some embodiments, the actuator 1910 may be positioned so as to be easily removed from the spool-selectable transmission 120 or other transmission system and replaced without removal of the entire transmission system. For instance, the actuator 1910 may be externally mounted on the transmission system. In other cases, the actuator 1910 may represent an external component and can be separate from the position controller 402. Also, in some embodiments, at least one position sensor 1914 may be used to identify the position of the shaft 1902 or to otherwise help identify the current position of the selective actuator 212. This can help in the sensing and verification of whether the clutch 210 has been moved into a suitable position, such as a neutral or engaged position.

As can be seen in the examples provided above, the various embodiments of the position controller 402 can be used to cause a selective actuator 212 to move a clutch 210 into one of multiple positions. In some cases, this includes three positions, namely a neutral position, a first engaged position (such as with the HP spool), and a second engaged position (such as with the LP spool). An assist mechanism can be used to help position the clutch 210 correctly during engine startup or at other times, and the assist mechanism may allow normal movement of the clutch 210 at other times. If a dual-acting hydraulic system or other system fails, an assist mechanism or a failsafe may be used to move the clutch 210 into a desired neutral or engaged position.

Although FIGS. 12A through 19C illustrate various examples of position controllers 402 for a clutch 210 and a selective actuator 212, various changes may be made to FIGS. 12A through 19C. For example, while specific linear and servo valve-actuated actuators and specific hydraulic and non-hydraulic systems are shown here and described above, any other suitable types of actuators and systems may be used in or with the position controllers 402. Also, as noted earlier, any suitable combinations of features shown in FIGS. 12A through 19C may be used in a position controller, even if that particular combination is not shown here.

It should be noted that while the gas turbine engine 100 is described above as having two spools, other gas turbine engines can have more than two spools. For example, a gas turbine engine could have an LP spool, an intermediate-pressure (IP) spool, and an HP spool. In some cases, various spool-selectable transmissions and position controllers described above could be configured for use with any two of three or more spools. In other cases, various spool-selectable transmissions and position controllers described above could be expanded for use with more than two spools.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a selectable transmission configured to selectively couple a specified one of multiple spools of an aircraft engine to an electric machine, wherein the selectable transmission comprises:

a mechanical output coupled to or forming a part of the electric machine;

at least one clutch configured to drive or be driven by the mechanical output;

at least one selective actuator configured to move the at least one clutch in order to selectively control which spool drives or is driven by the mechanical output; and one or more position controllers each configured to control one or more positions of one or more corresponding selective actuators and/or one or more positions of one or more corresponding clutches, wherein each position controller is movable and configured to move the one or more corresponding selective actuators and/or the one or more corresponding clutches between multiple positions, the multiple positions comprising:

a first position in which a first spool drives or is driven by the mechanical output;

a second position in which a second spool drives or is driven by the mechanical output; and a third position in which no spool drives or is driven by the mechanical output, wherein at least one of:

the electric machine is configured to speed match the at least one clutch to one of the spools to facilitate engagement; or a synchronizer is configured to speed match the electric machine to one of the spools or to speed match two or more of the spools.

2. The apparatus of claim 1, wherein:

the at least one clutch represents a single clutch;

the at least one selective actuator represents a single selective actuator; and the single selective actuator is configured to move the single clutch between the multiple positions to selectively control which spool drives or is driven by the mechanical output.

3. The apparatus of claim 2, wherein the multiple positions comprise:

the first position in which the single clutch is coupled to at least one gear associated with a first spool of the aircraft engine;

the second position in which the single clutch is coupled to at least one gear associated with a second spool of the aircraft engine; and the third position in which the single clutch is not coupled to the at least one gear associated with the first spool or to the at least one gear associated with the second spool.

4. The apparatus of claim 1, wherein:

the at least one clutch represents a first clutch associated with a first spool of the aircraft engine and a second clutch associated with a second spool of the aircraft engine;

the at least one selective actuator is configured to move the first clutch between the multiple positions to selectively control whether the mechanical output drives or is driven by the first spool; and the at least one selective actuator is configured to move the second clutch between the multiple positions to selectively control whether the mechanical output drives or is driven by the second spool.

5. The apparatus of claim 4, wherein:

the multiple positions of the first clutch comprise:

the first position in which the first clutch is coupled to at least one gear associated with the first spool; and the second position and the third position in which the first clutch is not coupled to the at least one gear associated with the first spool; and the multiple positions of the second clutch comprise:

the second position in which the second clutch is coupled to at least one gear associated with the second spool; and the first position and the third position in which the second clutch is not coupled to the at least one gear associated with the second spool.

6. The apparatus of claim 1, wherein the selectable transmission is configured to decouple mechanical power injection or extraction between the spools and the electric machine to facilitate the speed matching.

7. The apparatus of claim 1, wherein the at least one selective actuator comprises at least one selector fork.

8. The apparatus of claim 1, wherein the selectable transmission is integrated in the electric machine.

9. The apparatus of claim 1, wherein each position controller comprises a control piston.

10. The apparatus of claim 1, wherein an interface between each selective actuator and a corresponding clutch comprises a rolling element interface.

11. The apparatus of claim 10, wherein each rolling element interface comprises one of: a ball bearing interface, a roller bearing interface, a ball thrust bearing interface, a roller thrust bearing interface, or a tapered roller bearing interface.

12. The apparatus of claim 10, wherein each rolling element interface comprises rolling element bearings between at least one outer race and at least one inner race.

13. The apparatus of claim 12, wherein each clutch comprises at least one of:

an anti-rotation feature configured to prevent rotation of the corresponding selective actuator with respect to the rolling element interface; or an axial retainer configured to keep the corresponding selective actuator positioned over the outer race of the rolling element interface.

14. The apparatus of claim 12, wherein each selective actuator comprises springs positioned between the selective actuator and the outer race of the corresponding rolling element interface, the springs configured to provide a specified preload on the outer race of the corresponding rolling element interface.

15. The apparatus of claim 12, wherein, in each rolling element interface:

the outer race of the rolling element interface comprises a flange; and the flange is attached to the corresponding selective actuator.

16. The apparatus of claim 12, wherein:

the at least one outer race includes multiple outer races;

the at least one inner race includes multiple inner races; and the rolling element bearings are positioned between the multiple outer races and the multiple inner races.

17. The apparatus of claim 1, wherein the electric machine is configured to be commanded to stop generating electrical power to facilitate the speed matching.

18. A system comprising:

an aircraft engine comprising multiple spools;

an electric machine configured to selectively drive or be driven by one of the spools; and a selectable transmission configured to selectively couple a specified one of the spools to the electric machine, wherein the selectable transmission comprises:

a mechanical output coupled to or forming a part of the electric machine;

at least one clutch configured to drive or be driven by the mechanical output; and at least one selective actuator configured to move the at least one clutch in order to selectively control which spool drives or is driven by the mechanical output;

wherein:

an interface between each selective actuator and a corresponding clutch comprises a rolling element interface; and each rolling element interface comprises rolling element bearings positioned between multiple outer races and multiple inner races; and wherein at least one of:

the electric machine is configured to speed match the at least one clutch to one of the spools to facilitate engagement; or a synchronizer is configured to speed match the electric machine to one of the spools or to speed match two or more of the spools.

19. A method comprising:

using a selectable transmission to selectively couple one of multiple spools of an aircraft engine to an electric machine, wherein the selectable transmission comprises:

a mechanical output coupled to or forming a part of the electric machine;

at least one clutch configured to drive or be driven by the mechanical output; and at least one selective actuator configured to move the at least one clutch in order to selectively control which spool drives or is driven by the mechanical output; and driving the electric machine using one of the spools or driving one of the spools using the electric machine via the selectable transmission;

wherein:

an interface between each selective actuator and a corresponding clutch comprises a rolling element interface;

each rolling element interface comprises rolling element bearings between at least one outer race and at least one inner race;

each selective actuator comprises springs positioned between the selective actuator and the at least one outer race of the corresponding rolling element interface, the springs configured to provide a specified preload on the at least one outer race of the corresponding rolling element interface; and wherein at least one of:

the electric machine is configured to speed match the at least one clutch to one of the spools to facilitate engagement; or a synchronizer is configured to speed match the electric machine to one of the spools or to speed match two or more of the spools.

20. An apparatus comprising:

a selectable transmission configured to selectively couple a specified one of multiple spools of an aircraft engine to an electric machine, wherein the selectable transmission comprises:

a mechanical output coupled to or forming a part of the electric machine;

at least one clutch configured to drive or be driven by the mechanical output; and at least one selective actuator configured to move the at least one clutch in order to selectively control which spool drives or is driven by the mechanical output;

wherein at least one of:

the electric machine is configured to speed match the at least one clutch to one of the spools to facilitate engagement; or a synchronizer is configured to speed match the electric machine to one of the spools or to speed match two or more of the spools; and wherein:

the at least one clutch represents a single clutch;

the at least one selective actuator represents a single selective actuator; and the single selective actuator is configured to move the single clutch between multiple positions to selectively control which spool drives or is driven by the mechanical output.

* * * * *